US008589335B2

(12) United States Patent
Smith et al.

(10) Patent No.: US 8,589,335 B2
(45) Date of Patent: Nov. 19, 2013

(54) SMART CARD PERSONALIZATION ASSISTANCE TOOL

(75) Inventors: Carl Smith, Fremont, CA (US); Trudy Hill, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 1876 days.

(21) Appl. No.: 10/633,020

(22) Filed: Jul. 31, 2003

(65) Prior Publication Data

US 2004/0210566 A1  Oct. 21, 2004

Related U.S. Application Data

(60) Provisional application No. 60/464,559, filed on Apr. 21, 2003.

(51) Int. Cl.
*G06F 13/00* (2006.01)

(52) U.S. Cl.
USPC .................. 707/600; 726/9; 726/26; 235/380

(58) Field of Classification Search
USPC .......... 726/9, 26; 705/14, 2, 44, 1, 41, 10, 26; 235/492, 380; 707/2, 4, 600; 713/200, 713/187, 172
See application file for complete search history.

(56) References Cited

U.S. PATENT DOCUMENTS

| | | | |
|---|---|---|---|
| 5,748,484 A | 5/1998 | Cannon et al. | 364/479.03 |
| 5,765,142 A | 6/1998 | Allred et al. | 705/26 |
| 5,867,821 A * | 2/1999 | Ballantyne et al. | 705/2 |
| 5,884,289 A * | 3/1999 | Anderson et al. | 705/44 |
| 5,889,941 A | 3/1999 | Tushie et al. | |
| 5,984,181 A * | 11/1999 | Kreft | 235/380 |
| 6,005,942 A * | 12/1999 | Chan et al. | 713/187 |
| 6,012,049 A * | 1/2000 | Kawan | 705/41 |
| 6,014,748 A * | 1/2000 | Tushie et al. | 726/9 |
| 6,070,147 A * | 5/2000 | Harms et al. | 705/14 |
| 6,195,651 B1 * | 2/2001 | Handel et al. | 707/2 |
| 6,196,459 B1 * | 3/2001 | Goman et al. | 235/380 |
| 6,263,330 B1 * | 7/2001 | Bessette | 707/4 |
| 6,367,011 B1 * | 4/2002 | Lee et al. | 713/172 |
| 6,402,028 B1 | 6/2002 | Graham, Jr. et al. | 235/380 |
| 6,422,462 B1 * | 7/2002 | Cohen | 235/381 |

(Continued)

FOREIGN PATENT DOCUMENTS

DE    19958559 A1    7/2001
WO    WO99/19846    4/1999

OTHER PUBLICATIONS

Non-Patent Literature: "A Web-Enabled Framework for Smart Card Application in Health Services"; Alvin T.S. Chan, Jiannong Cao, Henry Chan, and Gilbert Young; Sep. 2001 ACM.*
International Search Report, dated Sep. 7, 2004.

(Continued)

*Primary Examiner* — Rehana Perveen
*Assistant Examiner* — Thuy Bui
(74) *Attorney, Agent, or Firm* — Kilpatrick Townsend & Stockton LLP

(57) ABSTRACT

A personalization of a batch of smart cards is provided. A user is provided with a plurality of queries regarding smart card features. Responses to the plurality of queries are received from the user. A personalization data file is generated using the responses to the plurality of queries, where the personalization data file comprises values, which may be used to provide features on a batch of smart cards.

12 Claims, 47 Drawing Sheets

(56) References Cited

U.S. PATENT DOCUMENTS

| | | | | |
|---|---|---|---|---|
| 6,729,549 | B2* | 5/2004 | Hamann et al. | 235/492 |
| 6,910,627 | B1* | 6/2005 | Simpson-Young et al. | 235/381 |
| 7,096,003 | B2* | 8/2006 | Joao et al. | 455/406 |
| 2001/0007333 | A1* | 7/2001 | Goman et al. | 235/380 |
| 2001/0042212 | A1* | 11/2001 | Du et al. | 713/200 |
| 2001/0048677 | A1 | 12/2001 | Boys | 370/352 |
| 2003/0145205 | A1* | 7/2003 | Sarcanin | 713/172 |
| 2004/0078227 | A1* | 4/2004 | Morris | 705/2 |

OTHER PUBLICATIONS

Anonymous: "Card Customization Guide, Version 1.0", www.globalplatform.org, Aug. 13, 2002, pp. 1-83.

Anonymous: "Multi Application Smart Card Management Systems Functional Requirements, Version 3.4", www.globalplatform.org, May 2001, pp. 1-84.

Australian Application No. 2004232121; Office Action dated May 4, 2009.

Office Action mailed Feb. 12, 2012 in Canadian Patent Application No. 2,523,154, 3 pages.

Carol Hovenga Fancher, "In Your Pocket SmartCard", Feb. 1997, IEEE Spectrum, pp. 47-53.

Chaum et al., "SmartCard 2000: The Future of IC Cards", Oct. 19, 1987, Elsevier Science Publishers, B.V., pp. 1-217.

Steven Levy, "E-Money (That's What I Want)", Dec. 1994, Wired Magazine, pp. 174-179, 213-219.

Carol H. Fancher, "Smart Cards as Potential Applications Grow, Computers in the Wallet are Making Unobstrusive Inroads", Aug. 1996, Scientific American Website, 10 pages.

Jerome Svigals, "SmartCards the New Bank Cards", 1985, MacMillan Publishing Company, pp. 11-38.

Roy Bright, "SmartCards: Principles, Practice, Applications", 1998, Ellis Horwood Limited, pp. 21-32, 48-90.

Jerome Svigals, "SmartCards the Ultimate Personal Computer", 1985, MacMillan Publishing Company, pp. 11-38.

Hawkes et al., "Integrated Circuit Cards, Tags and Tokens", 1990, BSP Professional Books, pp. 1-28, 64-99, 136-164.

David Naccache, "Cryptographic Smart Cards", Jun. 3, 1996, IEEE Micro 1996 Website, 19 pages.

Zoreda et al., "Smart Cards", 1994, Artech House, pp. 1-235.

"Identification Card Systems—Inter-Sector Electronic Purse Part I: Concepts and Structures", 1994, European Standard, prEN 1546, pp. 1-26.

"Identification Card Systems—Inter-Sector Electronic Purse Part 2: Security Architecture", 1994, European Standard, prEN XXXXX-2, pp. 1-96.

"Identification Card System—Inter-Sector Electronic Purse Part 3: Data Elements and Interchanges", 1994, European Prestandard, prEN 1546-3, pp. 1-67.

"Identification Card System—Inter-Sector Electronic Purse Part 4: Devices", 1994, European Prestandard, prEN 1546-4, pp. 1-35.

"Identification Cards—Integrated Circuit(s) Cards With Contacts Part 1: Physical Characteristics", 1987, International Standard, ISO 7816-1, First Edition, pp. 1-4.

"Identification Cards—Integrated Circuit(s) Cards With Contacts Part 2: Dimensions and Location of the Contacts", 1988, International Standard, ISO 7816-2, First Edition, pp. 1-7.

"Identification Cards—Integrated Circuit(s) Cards With Contacts Part 3: Electronic Signals and Transmission Protocols", International Standard, ISO/IEC 7816-3, First Edition, pp. 1-14, 1989.

"Identification Cards—Integrated Circuit(s) Cards with Contacts Part 4: Inter-Industry Commands for Interchange", International Standard, ISO/IEC 7816-4, First Edition, pp. 1-44, 1994.

"Identification Cards—Integrated Circuits(s) Cards With Contacts Part 5: Numbering System and Registration Procedure for Application Identifiers", 1993, International Standard, ISO/IEC DIS 7816-5, pp. 1-7.

"International Cards—Integrated Circuit(s) Cards With Contacts Part 6: Inter-Industry Data Elements", 1995, International Standard, ISO/IEC DIS 7816-6, pp. 1-13.

"Bank Cards—Magnetic Stripe Data Content for Track 3", 1987, International Standard, ISO 4909 Second Edition, pp. 1-10.

"Identification Cards—Physical Characteristics", 1995, International Standard, ISO/IEC 7810, Second Edition, pp. 1-5.

"Identification Cards—Recording Technique—Part 1: Embossing", 1995, International Standard, ISO/IEC 7811-1, Second Edition, 32 pages.

"Identification Cards—Recording Technique—Part 2: Magnetic Strip", 1995, International Standard, ISO/IEC 7811-2, Second Edition, 20 pages.

"Identification Cards—Recording Technique—Part 3: Location of Embossed Characters on ID-1 Cards", 1995, International Standard, ISO/IEC 7811-5, Second Edition, 8 pages.

"Identification Cards—Recording Technique—Part 4: Location of Read-Only Magnetic Tracks—Tracks 1 & 2", 1995, International Standard, ISO/IEC 7811-4, Second Edition, 8 pages.

"Identification Cards—Recording Technique—Part 5: Location of Read-Write Magnetic Track—Track 3", 1995, International Standard, ISO/IEC 7811-5, Second Edition, 8 pages.

"Identification Cards—Recording Technique—Part 6: Magnetic Stripe-High Coercivity", 1996, International Standard, ISO/IEC 7811-6, First Edition, pp. 1-27.

"Identification Cards—Financial Transaction Cards", 1990, International Standard, ISO/IEC 7813, Third Edition, pp. 1-4.

"Identification Cards—Financial Transaction Cards Amendment 1" 1996, International Standard, ISO/IEC 7813, Fourth Edition, 8 pages.

"Identification Cards—Contactless Integrated Circuit(s) Cards—Part 1: Physical Characteristics", 1992, International Standard, ISO/IEC 10536-1, First Edition, pp. 1-5.

"Identification Cards—Contactless Integrated Circuit(s) Cards—Part 2: Dimensions and Location of Coupling Areas", 1995, International Standard, ISO/IEC 10536-2, First Edition, pp. 1-6.

"Identification Cards—Contactless Integrated Circuit(s) Cards—Part 3: Electronic Signals and Reset Procedures", 1996, International Standard, ISO/IEC 10536-3, First Edition, pp. 1-20.

"Financial Transaction Cards-Security Architecture of Financial Transaction System Using Integrated Circuit Cards—Part 1: Card Life Cycle", Sep. 15, 1991, International Standard, ISO 10202-1, First Edition, 12 pages.

Hiro Shogase, "The Very Smart Card: A Plastic Pocket Bank", IEEE Spectrum, Oct. 1988, pp. 35-39.

* cited by examiner

PROFILE LISTING

User ID:                                                               Demo Bank Active Member Profiles for Visa Credit [Full Market]
Listed below are your active member profiles. You may select one from the list to modify or to use as base for your new profile.

| | Active Profile Label | BIN | Account Range | Unique ID | Set Status |
|---|---|---|---|---|---|
| ○ | FullVSDC-BASE | 111111 | 1111-1111-1111-1111 to 1111-1111-1111-1111 | 000000000005 | Active ▽ |
| ○ | FullVSDC-BASE | 111111 | 1111-1111-1111-1111 to 1111-1111-1111-1111 | 000000000017 | Pending ▽ |
| ○ | FullVSDC-BASE | 987654 | 1111-1111-1111-1111-111 to 2222-2222-2222-222 | 000000000023 | Pending ▽ |
| ○ | FullVSDC-BASE | 987654 | 5555-5555-5555-555 to 6666-6666-6666-666 | 000000000024 | Pending ▽ |
| ○ | FullVSDC-BASE_ccy0108 | 808080 | 1111-1111-1111-1111 to 8888-8888-8888-8888 | 000000000025 | Pending ▽ |
| ○ | Superbowl Base Jan 26 | 111111 | 1111-1111-1111-1111-123 to 1111-1111-1111-124 | 000000000040 | Pending ▽ |
| ○ | NewProfile_w_NewTags_1_27 | 111111 | 1111-1111-1111-1111 to 1111-1111-1111-1112 | 000000000042 | Pending ▽ |
| ○ | NewProfile_w_NewTags_2_05 | 121212 | 1212-1212-1212-1212 to 1212-1212-1212-1212 | 000000000058 | Pending ▽ |
| ○ | FullVSDC-BASE-michele22 | 222222 | 2222-2222-2222-2222 to 2222-2222-2222 | 000000000065 | Pending ▽ |
| ○ | FullVSDC-BASE-michele23 | 333333 | 3333-3333-3333-3333 to 3333-3333-3333-3333 | 000000000067 | Pending ▽ |

Search Profiles    Back        Add Profile    Modify Profile    View Details

| VOL Home | VPA Home | Profiles | Views | ▽ | Report Selection | Help | ▽ |

VSDC FEATURE SELECTION

User ID:          Demo Bank

You can use this screen to change the features supported by the profile.

Visa recommended settings are provided. If you do not need to make any changes, select Next to proceed to the next screen. If you need to make changes, check/un-check the appropriate boxes. Once you are finished making changes, click on the Save button to save changes and remain on the current screen or click on the Next button to save changes and proceed to the next screen.

When you make changes that are in violation of the Visa Best Practice, a Warning box will pop up to alert you that this has taken place.

Additional information is provided with the items in blue text. You can place your cursor on the blue text to obtain a pop up containing a brief description of the item or double click on the blue text to obtain more detailed information.

1804 —↗ Selecting Your Optional VSDC Features      Full/VSDC-BASE-michelle33(0000000057)

Your card must support a minimum set of data and functionality as follows:
- Account Data
- Cardholder Verification Methods (CVMs)
- Terminal Risk Management
- Card Authentication The VSDC Personalization Assistant will walk you through the personalization decisions to ensure this minimum data and functionality are supported by your card.

In addition, you can support optional features based on your market requirements. Please select from the optional features below (Visa- recommended optional settings are already checked for you):

- ☒ Offline Authentication Controls
- ☒ Offline Static Data Authentication (SDA)
- ☒ Offline Dynamic Data Authentication (DDA)
- ☒ Issuer Authentication
- ☒ Issuer-Script Processing
- ☒ Visa Low-Value Payment (VLP)

Note: Your card may not be able to support all of the optional features. Prior to selecting the optional features, you should discuss your card's capabilities with your card vendor. There may be limitations to specific features or options based on the card mask or based on the version of the Visa ICC Specification (VIS) the vendor used to develop the application (also referred to as the Application Version Number).

1608 — Profile Complete     1616 —    1612 — [ Save ] [ Back ] [ Next ] [ Cancel ] — 1624, 1620

FIG. 16

| VOL Home | VPA Home | Profiles ▽ | Views ▽ | Report Selection ▽ | Help ▽ |

ACCOUNT USAGE CONTROLS

User ID:                                                          Demo Bank

You can use this screen to specify where and how your account can be used.

Visa strongly recommends that you use the Visa recommended settings and simply proceed to the next screen by selecting Next. If you need to make changes, check/un-check the appropriate boxes. Once you are finished making changes, click on the Save button to save changes and remain on the current screen or click on the Next button to save changes and proceed to the next screen.

Determining Where and How Your Account can be Used        NewProfile_w_NewTags_1_27(02038000042)

Your card must support a minimum set of data and functionality as follows:

| | Domestic | International |
|---|---|---|
| ▷ Cash | ☑ | ☑ |
| ▷ Goods and Services | ☑ | ☑ |
| ▷ Cashback | ☑ | ☑ |

Will you allow the card to be used at ATMs?     ○No    ⦿Yes

Will you allow the card to be used at terminals other than ATMs (point of sale, etc.)?     ○No    ⦿Yes

1704

| Profile Complete |                           | Save | Back | Next | Cancel |

*FIG. 17*

| VOL Home | VPA Home | Profiles | ▽ Views | ▽ Report Selection | Help ▽ |

ACCOUNT IDENTIFICATION

User ID:      Demo Bank

You can use this screen to set up the account identification information.

Visa strongly recommends that you use the Visa recommended settings and simply proceed to the next screen by selecting Next. If you need to make changes, check/un-check the appropriate boxes. Once you are finished making changes, click on the Save button to save changes and remain on current screen or click on the Next button to save changes and proceed to the next screen.

Identifying Your Account      NewProfile_w_NewTags_1_27(0X000X0042)

▷ Your account is a Visa Credit account. Therefore, the identifier for this account is:      ▷ A0000000031010

▷ Do you have more than 1 Visa credit/debit account on the card?      ○ No    ● Yes Note: A Visa credit/debit account is defined as either Visa Credit or Visa Debit/It does not include Visa Electron. Therefore, if your card only includes Visa Credit and Visa Electron (or Visa Debit and Visa Electron), you should answer No to this question.

▷ For cards with more than 1 Visa credit/debit account and for cards where you might add a credit/debit application to the card via a post-issuance download, you need to add additional information to this identifier so that the terminal recognizes all of the accounts. Please provide the extension information is referred to as an extension. Please provide the extension in the space provided.      [ 01 ]

1804

| Profile Complete | | Save | Back | Next | Cancel |

FIG. 18

| VOL Home | VPA Home | Profiles | ▽ Views | ▽ Report Selection | Help |

CONFIRMING USAGE OF YOUR ACCOUNT

User ID:                                                         Demo Bank

Confirming Usage of Your Account      NewProfile_v_NewTags_1_27(0000000000042)

▷ Do you have more than 1 Visa payment account on the card (e.g., a card with 2 Visa Credit accounts, a card with 1 Visa Debit and 1 Visa Electron account or a card with 1 Visa Credit and 1 Visa Electron account)?     ○ No    ⦿ Yes ▷ When there are two or more Visa payment applications on the card, you can elect to ensure that the cardholder confirms use of the application whenever the application is used -- however, at least one of those applications should NOT require the cardholder confirmation. If you want to require cardholder confirmation on one of your Visa payment accounts, do you want it to be on this account?     ○ No    ⦿ Yes Note: A terminal may not support cardholder confirmation of the application. If you require cardholder confirmation of the application and the card is used at a device that does not support it the application will not be accepted. Therefore, if you require cardholder confirmation on this application, you should NOT require it on the other Visa payment application that resides on the card. This ensures that at least one Visa payment application on the card will be accepted at terminals that do not support cardholder confirmation.

| Save | Back | Next | Cancel |

Profile Complete

*FIG. 19*

| VOL Home | VPA Home | Profiles | ▽ | Views | ▽ | Report Selection | Help | ▽ |

CUSTOMIZING YOUR ACCOUNT NAME

User ID:                                Demo Bank

2004 ⟶ Customizing Your Account Name    NewProfile_w_NewTags_1_ZT(0000000000042)

▷ Where terminals support display capabilities, the account will be displayed to the cardholder as "Visa Credit." You can, however, customize the display of the account name to your cardholders. Would you like to do this?    ○ No    ⊙ Yes

Note: You should answer "yes" to this question if you have multiple accounts of the same type on your card (e.g. 2 Visa Credit accounts) so that these accounts can be displayed uniquely to the cardholder.

▷ Please provide your customized account name:    [ Visa Credit 111 ]

▷ From the drop down box, please select the alphabet that your customized account name should be displayed in.    [ Latin 1 (Western European) ▽ ]

[ Save ] [ Back ] [ Next ] [ Cancel ]

[ Profile Complete ]

| VOL Home | VPA Home | Profiles | ▽ Views | ▽ Report Selection | Help ▽ |

PRIORITIZING YOUR ACCOUNT

User ID:                  Demo Bank

Prioritizing Your Account      NewProfile_w_NewTags_1_27(0&00000xx42)

▷ You can prioritize your account. This ensures that higher priority accounts are displayed to the cardholder first where supported by the terminal. From the drop down box, please select a priority for this account.

[ 1 ▽ ]

Note: This value MUST be set to 01 if the account is the account on the physical magnetic stripe.

[ Save ] [ Back ] [ Next ] [ Cancel ]

Profile Complete

| VOL Home | VPA Home | Profiles | ▽ Views | ▽ Report Selection | Help ▽ |

OFFLINE RISK MANAGEMENT CONTROLS

User ID:                                                                 Demo Bank You can use this screen to specify your Offline Authorization Control options.

You can use Visa recommended settings by selecting Next or you can make changes. Once you are finished making changes, click on the Save button to save changes and remain on the current screen or click on the Next button to save changes and proceed to the next screen.

| Defining Your Offline Risk Management Controls | NewProfile_w_NewTags_1_27(XXXXXXXX42) |

With VSDC, you can manage your risk on offline transactions by specifying that certain transactions (based on limits and thresholds) are sent online to the issuer. To provide the greatest amount of security, these risk checks can be performed by both the card and terminal. Please specify if you want these risk checks to be performed by the card and/or terminal by answering the following questions:

▷ Do you want the card to perform risk management checks at the point of transaction based on limits and thresholds that you specify?    ○ No    ⦿ Yes Note: Visa strongly recommends that you answer yes to this question ▷ Do you want the terminal to perform risk management checks at the point of transaction based on limits and thresholds that you specify?    ○ No    ⦿ Yes

| Save | Back | Next | Cancel |

Profile Complete

| VOL Home | VPA Home | Profiles ▽ | Views ▽ | Report Selection | Help ▽ |

OFFLINE LIMITS AND THRESHOLDS

User ID: _____  Demo Bank

You can use this screen to set up your offline limits and thresholds.

Visa best practices and recommended settings, are provided. If you do not need to make any changes, select Next to move to the next section. Once you have made your selection, click on the Save button to save the changes or click on the Next button to save changes and move on to the next section.

Defining Your Offline Limits and Thresholds   NewProfile_w_NewTags_1_27(000000000042)

Defining Your Offline Transaction Limits

▷ Please provide the number of consecutive offline transactions allowed before an online transaction is required.   [2 ▽]
Note: This value cannot go below 2.

▷ Please provide the number of consecutive offline transactions allowed before declining the transaction when an online transaction cannot be completed.   [2 ▽]

▷ Do you wish to control the total number of offline international transactions allowed before declining a transaction when an online authorization cannot be completed?   ○ No   ● Yes
Note: For this check, international transactions are those in a currency different from the card's currency code.
   ▷ Please provide this number in the space provided   [2 ▽]

▷ Do you wish to control the total number of offline international transactions allowed before an online authorization is requested?   ○ No   ● Yes
Note: For this check, international transactions are those originating at a terminal in a country that is not the country of card issuance.
   ▷ Please provide this number in the space provided   [4 ▽]

Defining Your Offline Amount Limits

▷ Do you wish to control the cumulative amount of offline transactions allowed in the card's currency before an online authorization is required?   ○ No   ● Yes
   ▷ Please provide this amount in the space provided   [00000000005]

▷ Do you wish to control the cumulative amount of offline transactions allowed in the card's currency before declining a transaction when an online authorization cannot be completed?   ○ No   ● Yes
   ▷ Please provide the cumulative amount over which a decline is generated in the space provided.   [00000000006]

Declining Your Offline Amount Limits in a Secondary Currency

▷ Do you wish to control the cumulative amount of offline transactions allowed in either the card's primary currency or a secondary currency before an online authorization is required?   ○ No   ● Yes
   2508
   ▷ Please provide the secondary currency in the space provided   [US Dollar]

▷ What is the relationship between the secondary currency and the card's primary currency; that is, how many units of the primary currency are equal to a single unit of the secondary currency?   ▷ 0.019
   ▷ Please provide the multiplication factor for going from the secondary currency to the primary currency in the space provided.   [19]
   ▷ Please provide the number of digits of this factor that are to the right of the decimal point in the space provided.
   For example: if one unit of the secondary currency is .019 units of the primary currency, the multiplication factor is 19 and the number of digits to the right of the decimal point is 3.   [3]
   ▷ What is the cumulative amount of the transactions in the card's primary currency or in the secondary currency allowed prior to requiring an online authorization? This amount limit should be provided in the card's primary currency.   [00000000789]

[Profile Complete]   FIG. 25   [Save] [Back] [Next] [Cancel]

2604

| VOL Home | VPA Home | Profiles ▽ | Views ▽ | Report Selection | Help ▽ |

CHECKING ACCOUNT EFFECTIVE DATE

User ID:					Demo Bank

You can use this screen to make your offline risk management decisions related to Offline Authorization Controls.

Visa strongly recommends that you use the Visa recommended settings and simple proceed to the next screen by selecting Next. If you need to make changes, check/un-check the appropriate boxes. Once you are finished making changes, click on the Save button to save the changes and remain on the current screen or click on the Next button to save changes and proceed to the next screen.

Checking Account Effective Date            NewProfile_w_NewTags_1_27(000000000042)

For each of the following conditions at the point of transaction, indicate the action to be taken by the terminal. You can select one of the following:

- Decline Transaction Offline (declines the transaction "offline" at the point of transaction).

- Send Online (sends the transaction online to the issuer).

- Send Online and Decline if Online Unavailable (sends the transaction online to the issuer but if online is unavailable, the transaction is declined offline). This is achieved by clicking both the "Send Online" and "Decline if Online Unavailable" boxes)

If you do not indicate an action to be taken, the risk management check will not be included in the approve offline, send online, decline offline decision.

▷ In addition to the expiration date, you can include the effective date on     ○ No     ● Yes
the card. Are you planning to do this? (Y/N)

| Offline Risk Management Decisions | Decline Transaction Offline | Send Online | Decline if Online Unavailable |
|---|---|---|---|
| ▷ If the account is not yet effective, what action should be taken? | ☑ | ☐ | ☐ |

Note: If you support the effective date, you will need to merge the effective date (along with the other account and cardholder data) with the output file from this tool.

[Profile Complete]                    [Save] [Back] [Next] [Cancel]

| VOL Home | VPA Home | Profiles ▽ | Views ▽ | Report Selection | Help ▽ |

OFFLINE RISK MANAGEMENT DECISIONS

User ID:  Demo Bank

You can use this screen to make your offline risk management decisions related to Offline Authorization Controls.

Visa strongly recommends that you use the Visa recommended settings and simple proceed to the next screen by selecting Next. If you need to make changes, check/un-check the appropriate boxes. Once you are finished making changes, click on the Save button to save the changes and remain on the current screen or click on the Next button to save changes and proceed to the next screen.

Making Your Offline Risk Management Decisions     NewProfile_w_NewTags_1_27(000000000042)

For each of the following conditions at the point of transaction, indicate the action to be taken by the terminal. You can select one of the following:

- Decline Transaction Offline (declines the transaction "offline" at the point of transaction).
- Send Online (sends the transaction online to the issuer).
- Send Online and Decline if Online Unavailable (sends the transaction online to the issuer but if online is unavailable, the transaction is declined offline). This is achieved by clicking both the "Send Online" and "Decline if Online Unavailable" boxes)

If you do not indicate an action to be taken, the risk management check will not be included in the approve offline, send online, decline offline decision.

| Offline Risk Management Decisions | Decline Transaction Offline | Send Online | Decline if Online Unavailable |
|---|---|---|---|
| ▷ If the card is being used for the first time (new card), what action should be taken? | ☐ | ☑ | ☐ |
| ▷ If chip-related data is missing from the card, what action should be taken? | ☑ | ☐ | ☐ |
| ▷ If the lower limit defined on the card which allows a specific number of offline transactions to take place is reached, what action should be taken? | ☑ | ☐ | ☐ |
| ▷ If the upper limit defined on the card which allows a specific number of offline transactions to take place is reached, what action should be taken? | ☑ | ☐ | ☐ |
| ▷ If the transaction is declined offline, should an advice be created? (Y/N) | ○ No | ● Yes | |

[ Profile Complete ]      [ Save ] [ Back ] [ Next ] [ Cancel ]

FIG. 27

| VOL Home | VPA Home | Profiles | Views | Report Selection | Help |

CARDHOLDER VERIFICATION METHODS (CVMS)

User ID: _____   Demo Bank

NewProfile_w_NewTags_1_27(000000000042)

Determining Your Cardholder Verification Method Options

You need to communicate the cardholder verification methods that your card supports (such as signature, Offline PIN, and Online PIN) to the terminal during a transaction. This is accomplished through the Cardholder Verification Method (CVM) List that you personalizes on your card.

The VSDC Personalization Assistant helps you create your CVM List in two different ways:

With Method 1, the VSDC Personalization Assistant asks you a series of easy questions about the cardholder verification methods you want to support and then automatically builds the list for you.

With Method 2, you can create your own CVM List.
Note: You should only use Method 2 if you are knowledgeable about CVM Lists. In addition, if you use Method 2, your CVM List must be approved by your Visa region prior to personalization.

Please select either Method 1 or Method 2.

Profile Complete                    Method 1    Method 2    Back

| VOL Home | VPA Home | Profiles ▽ | Views ▽ | Report Selection ▽ | Help ▽ |

CARDHOLDER VERIFICATION METHOD OPTIONS

User ID:      Demo Bank

Please select or enter required data. Best Practices and Visa recommended values are used as defaults. Once you have made your selection, click on the Apply button to save the changes or click on the Next button to save changes and move on to the next section.

Amount and Offline PIN Options    VSDC_BASE_FULL_OA_credit_cja01(0000000000015)

▷ Please provide the number of PIN tries allowed.    | 1 ▽ |    | USD |

▷ Determine the application currency code.    | US Dollar ▽ |    | USD |

| Save | Back | Next | Cancel |

Profile Complete

CVM ASSISTANT QUESTIONNAIRE METHOD 1

| VOL Home | VPA Home | Profiles | ▽ Views | ▽ Report Selection | Help |

User ID: _____  Demo Bank

Amount and Offline PIN Options

NewProfile_w_NewTags_1_37(0830000X0042)

You must answer each of the following questions related to cardholder verification so that the VSDC Personalization Assistant can create an appropriate CVM List for your account.

▷ Do you require separate CVM Lists for domestic and international transactions?   ● No   ○ Yes

Note: This question allows you to support two CVM Lists on a single application not on two separate applications. For most situations Visa does not recommend that you configure you card with two CVM Lists as a single CVM List is flexible enough to handle most scenarios.

3004

| Profile Complete | | Save | Back | Next | Cancel |

| VOL Home | VPA Home | Profiles ▽ | Views ▽ | Report Selection | Help ▽ |

CVM ASSISTANT QUESTIONNAIRE METHOD 1

User ID: _____ Demo Bank

CVM Assistant            NewProfile_w_NewTags_1_27(000000000042)

You must answer each of the following questions related to cardholder verification so that the VSDC Personalization Assistant can create an appropriate CVM List for your account.

▷ Will you allow your cardholder to be validated using Offline Plaintext PIN?    ○ No    ⦿ Yes ▷ Will you allow your cardholder to be validated using Offline Enciphered PIN? If you decide to support Offline Enciphered PIN, it is strongly recommended that you also support Offline Plaintext PIN.    ○ No    ⦿ Yes ▷ At ATMs supporting both Offline PIN and Online PIN, should Offline PIN be used instead of Online PIN?    ⦿ No    ○ Yes ▷ Will you allow Offline PIN to be used for manual cash OR purchase transactions with cash back?    ⦿ No    ○ Yes ▷ Will you allow Signature to be used for manual cash and purchase transactions with cash back?    ○ No    ⦿ Yes ▷ Will you allow Online PIN to be used for purchase transactions without cash back?    ○ No    ⦿ Yes ▷ Since you answered yes to allow Online PIN for purchase transactions without cashback, do you prefer Online PIN to be used as the cardholder verification method for purchase transactions without cashback when the device supports both Online PIN and signature?

Note: When you answer yes, you are stating that you prefer Online PIN to be used for purchase transactions without cash back when the device supports both Online PIN and signature. When you answer no, you are stating that you prefer Signature to be used for purchase transactions without cash back when the device supports both Online PIN and signature.    ○ No    ⦿ Yes

[ Profile Complete ]      FIG. 31      [ Save ] [ Back ] [ Next ] [ Cancel ]

| VOL Home | VPA Home | Profiles ▽ | Views ▽ | Report Selection | Help ▽ |

CARDHOLDER VERIFICATION METHOD SUMMARY

User ID:                                                                 Demo Bank Your CVM List Summary                           NewProfile_w_NewTags_1_27(000000000042)

ATM transactions

- Online PIN is required at ATMs.

Manual cash and purchase with cashback transactions

- Online PIN is used when the device supports Online PIN.
- Signature is required when the device does not support Online PIN.

Purchase without cashback transactions

- Offline Enciphered PIN is used if the device supports it.
- Offline Plaintext PIN is used when the device supports it but not Offline Enciphered PIN.
- Online PIN is used when the device supports it but neither Offline PIN method.
- Signature is used when the device supports it but not any Online or Offline PIN method.
- When the device supports none of the above, no CVM checks are required at devices not requiring CVM entry. CVM processing fails at devices requiring CVM entry.

| Profile Complete |                                    | Back | Next |

| VOL Home | VPA Home | Profiles ▽ | Views ▽ | Report Selection | Help ▽ |

CARDHOLDER VERIFICATION METHOD 2

User ID:                                                                                          Demo Bank Please select or enter required data. Best Practices and Visa recommended values are used as defaults. Once you have made your selection, click on the Apply button to save the changes or click on the Next button to save changes and move on to the next section.

Cardholder Verification Methods                    NewProfile_w_NewTags_1_27(000000000042)

The CVM List contains two amount fields that the terminal may use to determine the CVM to use for a transaction. These amount fields are called Amount X and Amount Y. A CVM entry in the CVM List may contain a CVM condition that specifies that the CVM is used only if the transaction amount is over Amount X. CVM conditions are also available for under Amount X, over Amount Y, and under Amount Y. These amount-related conditions are only considered when the transaction currency is the same as the application currency.

Visa does not recommend the use of the amount-related CVM conditions. When these CVM conditions are not used, Amount X and Amount Y should be defined as zero.

▷ This is the CVM list for                  [For Both Domestic and International CVM ▽]
▷ The first amount field (specified as "X"):  [0000000000                              ▽]
▷ The second amount field (specified as "Y"): [0000000000                              ▽]
▷ Determine the application currency code:    [Afghani                                 ▽]

| Priority | Choose the Cardholder Verification Method to use: | Choose when to use this verification method: | Choose the action to take if this cardholder verification is not successful: |
|---|---|---|---|
| 1 | [Fail CVM processing ▽] | [Always ▽] | [Fail cardholder verification if this CVM1 ▽] |

[Add CVM Method]

[Profile Complete]                                        [Save] [Back] [Next] [Cancel]

| VOL Home | VPA Home | Profiles ▽ | Views ▽ | Report Selection | Help ▽ |

CARDHOLDER VERIFICATION RISK MANAGEMENT DECISIONS

User ID:                                                                Demo Bank You can use this screen to make your risk management decisions related to cardholder verification.

Visa strongly recommends that you use the Visa recommended settings and simple proceed to the next screen by selecting Next. If you need to make changes, check/un-check the appropriate boxes. Once you are finished making changes, click on the Save button to save the changes and remain on the current screen or click on the Next button to save changes and proceed to the next screen.

Making Your Cardholder Verification Risk Management Decisions

For each of the following conditions at the point of transaction, indicate the action to be taken by the terminal. You can select one of the following:

- Decline Transaction Offline (declines the transaction "offline" at the point of transaction).
- Send Online (sends the transaction online to the issuer).
- Send Online and Decline if Online Unavailable (sends the transaction online to the issuer but if online is unavailable, the transaction is declined offline). This is achieved by clicking both the "Send Online" and "Decline if Online Unavailable" boxes)

If you do not indicate an action to be taken, the risk management check will not be included in the approve offline, send online, decline offline decision.

| Cardholder Verification Risk Management Decisions | Decline Transaction Offline | Send Online | Decline if Online Unavailable |
|---|---|---|---|
| ▷ If cardholder verification is not successful, what action should be taken? | ☑ | ☐ | ☐ |
| ▷ If one of the cardholder verification methods in the card's CVM List is not recognized by the terminal, what action should be taken? | ☑ | ☐ | ☐ |

Making Your PIN Pad Risk Management Decisions

| | | | |
|---|---|---|---|
| ▷ If Offline PIN is required and the PIN pad is not working or not present, what action should be taken? | ☑ | ☐ | ☐ |
| ▷ If Offline PIN is required and the PIN pad is present but the cardholder's PIN is not entered, what action should be taken? | ☑ | ☐ | ☐ |

Making Your PIN Try Limit Risk Management Decisions

| | | | |
|---|---|---|---|
| ▷ If the Offline PIN Try Limit is exceeded, what action should be taken? | ☑ | ☐ | ☐ |

| | | |
|---|---|---|
| ▷ If the Offline PIN Try Limit is exceeded on the current transaction and the transaction is declined offline, should an advice be created? | ◉ No | ○ Yes |
| ▷ If the Offline PIN Try Limit is exceeded on the current transaction, should the application be blocked? | ◉ No | ○ Yes |
| ▷ If the Offline PIN Try Limit is exceeded on the previous transaction, should the transaction be declined offline? | ○ No | ◉ Yes |
| ▷ If the Offline PIN Try Limit is exceeded on the previous transaction, should the transaction be transmitted online? | ◉ No | ○ Yes |
| ▷ If the Pin Try Limit is exceeded on the previous transaction, should the transaction be declined offline if online transmission is not possible? | ◉ No | ○ Yes |
| ▷ If the Pin Try Limit is exceeded on the present transaction, should the transaction be declined and the application be blocked? | ○ No | ◉ Yes |

[ Profile Complete ]          FIG. 34          [ Save ] [ Back ] [ Next ] [ Cancel ]

| VOL Home | VPA Home | Profiles | ▽ Views | ▽ Report Selection | Help ▽ |

OFFLINE DYNAMIC DATA AUTHENTICATION

Demo Bank

User ID:

You can use this screen to specify information related to Offline Dynamic Data Authentication.

You can use the Visa recommended settings by selecting Next or you can make changes. Once you are finished making changes, click on the Save button to save changes and remain on the current screen or click on the Next button to save changes and proceed to the next screen.

Determining the Data to be Validated During Offline Dynamic Data Authentication    NewProfile w_NewTags_1_27(000000000042)

You have chosen to support Offline Dynamic Data Authentication.

During Offline Dynamic Data Authentication, terminal-related data is validated. At a minimum, this data includes the Unpredictable Number (a number randomly generated by the terminal). In addition to the Unpredictable Number, you can have additional terminal data validated.

Do you wish to include additional terminal data elements in the DDA calculation (DDOL)?  ○ No   ● Yes ▷ Please select the additional data elements from the list.

| Transaction Sequence Counter | >> | Transaction Sequence Counter |
| Transaction Time | << | |

[Save] [Back] [Next] [Cancel]

Profile Complete

OFFLINE DATA AUTHENTICATION RISK MANAGEMENT DECISIONS

| VOL Home | VPA Home | Profiles | ▽ Views | ▽ Report Selection | Help ▽ |

User ID:                                                          Demo Bank

You can use this screen to make your account risk management decisions.

Visa strongly recommends that you use the Visa recommended settings and simply proceed to the next screen by selecting Next. If you need to make changes, check/un-check the appropriate boxes. Once you are finished making changes, click on the Save button to save changes and remain on the current screen or click on the Next button to save changes and proceed to the next screen.

Making Your Offline Data Authentication Risk Management Decisions          NewProfile_w_NewTags_1_27(0000000042)

For each of the following conditions at the point of transaction, indicate the action to be taken by the terminal. You can select one of the following:

- Decline Transaction Offline (declines the transaction "offline" at the point of transaction)
- Send Online (sends the transaction online to the issuer)
- Send Online and Decline if Online Unavailable (sends the transaction online to the issuer but if online is unavailable, the transaction is declined offline). This is achieved by clicking both the "Send Online" and "Decline if Online Unavailable" boxes.

If you do not indicate an action to be taken the risk management check will not be included in the approve offline, send online, decline offline decision.

Offline Data Authentication Risk Management Decisions

| | Decline Transaction Offline | Send Online | Decline if Online Unavailable |
|---|:---:|:---:|:---:|
| ▷ If Offline Data Authentication (either SDA or DDA) was not performed, what action should be taken? | ☑ | ☐ | ☐ |
| ▷ If Offline Static Data Authentication (SDA) fails, what action should be taken? | ☑ | ☐ | ☐ |
| ▷ If Offline Dynamic Data Authentication (DDA) fails, what action should be taken? | ☑ | ☐ | ☐ |

[ Save ] [ Back ] [ Next ] [ Cancel ]

[ Profile Complete ]

| VOL Home | VPA Home | Profiles | ☑ Views | ☑ Report Selection | Help ▽ |

CARD AUTHENTICATION OPTIONS

User ID: _____ Demo Bank

You can Use this screen to specify your Card Authentication options.

Please select or enter required data. Best Practices and Visa recommended values are used as defaults. Once you have made your selection, click on the Save button to save the changes or click on the Next button to save changes and move on to the next section.

Defining Your Card Authentication Options    NewProfile_w_NewTags_1_27(00000000042) ⟵ 3708

Visa supports three methods for creating an Application Cryptogram (a cryptogram that is sent online to the issuer in the authorization message). Each method is identified by a Cryptogram Version Number.

▷ Please indicate the Cryptogram Version Number you will support.    | Cryptogram Version Number 10 ▽ |

3704 ⟶

Cryptogram Version Number 10 is Visa's standard method for creating an Application Cryptogram. It indicates the set of data used to generate the cryptogram. This method supports eleven mandatory data elements. With Cryptogram Version Number 10, the cryptogram can be validated by VisaNet.

Cryptogram Version Number 12 can be used for domestic cryptogram definition, to support issuers in markets where the acquiring infrastructure for chip is not yet in place, or where issuers want to move to market quickly and later migrate to a more robust VSDC product. With Cryptogram Version Number 12, the cryptogram cannot be validated by VisaNet.

Cryptogram Version Number 14 is offered as an option for issuers that wish to minimize use of the card's Unique Derivation Key (UDK). With Cryptogram Version Number 14, a 16-byte session key is generated with each transaction using the session key from the previous transaction and the Application Transaction Counter. With Cryptogram Version Number 14, the cryptogram cannot be validated by VisaNet.

| Profile Complete |                    | Save | Back | Next | Cancel |

| VOL Home | VPA Home | Profiles ▽ | Views ▽ | Report Selection | Help ▽ |

ISSUER AUTHENTICATION OPTIONS

User ID:                                          Demo Bank

You can use this screen to define your Issuer Authentication options.

Visa strongly recommends that you use the Visa recommended settings and simple proceed to the next screen by selecting Next. If you need to make changes, check/un-check the appropriate boxes. Once you are finished making changes, click on the Save button to save the changes and remain on the current screen or click on the Next button to save changes and proceed to the next screen.

Defining Your Issuer Authentication Options      NewProfile_w_NewTags_1_27(000000000042)

You have elected to support Issuer Authentication.

▷ Please indicate whether Issuer Authentication is mandatory or optional on your card.      [Optional ▽]

▷ If Issuer Authentication is performed and failed, should the next transaction be sent online?      ○No    ⦿Yes ▷ If Issuer Authentication is performed and failed, should the next transaction be declined?      ○No    ⦿Yes ▷ If transaction was declined because Issuer Authentication failed or was not performed, should an advice be created?      ○No    ⦿Yes

[Profile Complete]                        [Save] [Back] [Next] [Cancel]

*FIG. 38*

| VOL Home | VPA Home | Profiles | ▽ Views | ▽ Report Selection | Help ▽ |

ISSUER SCRIPT RISK MANAGEMENT DECISIONS

User ID:          Demo Bank

You can use this screen to define your Issuer Authentication options.

Visa strongly recommends that you use the Visa recommended settings and simply proceed to the next screen by selecting Next. If you need to make changes, check/un-check the appropriate boxes. Once you are finished making changes, click on the Save button to save the changes and remain on the current screen or click on the Next button to save changes and proceed to the next screen.

Making Your Issuer Script Risk Management Decisions    VSDC_BASE_FULL_OA_credit_cb01(0808080815)

▷ If issuer script processing fails (e.g., the card attempts to update data using the script command from the issuer but the update is not successful, do you want to send the next transaction online?    ● No    ○ Yes    [USP]

3904

| Save | Back | Next | Cancel |

Profile Complete

FIG. 39

| VOL Home | VPA Home | Profiles | ▽ Views | ▽ Report Selection | Help ▽ |

VISA LOW-VALUE PAYMENT FEATURE

User ID:                                                              Demo Bank

You can use this screen to change the features supported by VLP.

If you do not need to make any changes, select Next to proceed to the next screen. Once you are finished making changes, click on the Save button to save changes and remain on the current screen or click on the Next button to save changes and proceed to the next screen.

| VLP Feature Selection | VSDC_BASE_FULL_OA_credit_cis01(0000000015) |

You can change your setting related to Offline Data Authentication to either support or not support SDA and/or DDA on VLP transactions. To change your SDA/DDA options, please check/un-check the appropriate boxes.

☑ Offline Static Data Authentication (SDA)     [USP]
☑ Offline Dynamic Data Authentication (DDA)   [USP]

In determining whether to change your settings, you should consider your transaction speed and security requirements.
Note: For DDA, please ensure that your card can support it before selecting it.

| Profile Complete |                                            | Save | Back | Next | Cancel |

| VOL Home | VPA Home | Profiles ▽ | Views ▽ | Report Selection | Help ▽ |

VLP CVM ASSISTANT QUESTIONAIRE

User ID:                                                                Demo Bank

CVM Assistant                           NewProfile_w_NewTags_1_27(000000000042)

Please answer the following questions so that the VSDC Personalization Assistant can create an appropriate Cardholder Verification Method List for VLP.

▷ Should the same cardholder verification methods used for VSDC apply to VLP?     ⦿ No   ○ Yes

Note: This question allows you to support two CVM Lists on a single application not on two separate applications. For most situations Visa does not recommend that you configure you card with two CVM Lists as a single CVM List is flexible enough to handle most scenarios.

| Profile Complete |         | Save | Back | Next | Cancel |

| VOL Home | VPA Home | Profiles ▽ | Views ▽ | Report Selection | Help ▽ |

CVM ASSISTANT QUESTIONNAIRE

User ID:                                                                Demo Bank

CVM Assistant                           NewProfile_w_NewTags_1_27(000000000042)

You must answer each of the following questions related to cardholder verification so that the VSDC Personalization Assistant can create an appropriate CVM List for your account.

▷ Will you allow your cardholder to be validated using the Offline Plaintext PIN on VLP transactions?     ⦿ No   ○ Yes ▷ Will you allow your cardholder to be validated using the Offline Enciphered PIN on VLP transactions? If you decide to support Offline Enciphered PIN, it is strongly recommended that you also support Offline Plaintext PIN.     ⦿ No   ○ Yes

| Profile Complete |         | Save | Back | Next | Cancel |

| VOL Home | VPA Home | Profiles ▽ | Views ▽ | Report Selection | Help ▽ |

VPL CODE AND LIMITS

User ID:  Demo Bank

You can use this screen to define your VLP settings.

Please select or enter required data. Best Practices and Visa recommended values are used as defaults. Once you have made your selection, click on the Save button to save the changes or click on the Next button to save changes and move on to the next section.

---

Defining Your VLP Data Settings  NewProfile_w_NewTags_1_27(000000000042)

You need to provide some additional information for VLP*.

▷ The VLP Authorization Code is a 3 digit code preceded by "VLP".  VLP [123]

Note: This code is either provided by the issuer or dynamically generated by the application. Please check with your application vendor to determine if your VSDC application generate this value. If your VSDC application dynamically generates this value, leave this space blank. If not, please provide the authorization code in this space.

▷ The VLP Funds Limit is mandatory. Please provide the limit in the space provided.  [000000000011]

▷ Visa recommends that you also support a VLP Single Transaction Limit.  ○ No   ● Yes
  Do you want to support it?

▷ Please provide your VLP Single Transaction Limit in the space provided  [000000007193]

---

| Profile Complete |   | Save | Back | Next | Cancel |

FIG. 44

| VOL Home | VPA Home | Profiles | ▽ Views | ▽ Report Selection | Help |

REPORT SELECTION

User ID:                             Demo Bank

Report Types         NewProfile_w_NewTags_1_2710000000000042

VSDC Personalization Assistant (VPA) tool allows you to generate different reports. To generate a report or a data output file, please select one of the following options:

⦿ Generate a Business Report
○ Generate a Technical Report
○ Generate a Data Preparation Output File
○ Generate a VisaNet Stand-in Settings Report

[CSV File Format ▽]

| Profile Complete | | View Report | Back |

*Sample Business Report:*

| Business Report for FULLVSDC_ISSUER_CREDITPROFILE01 | |
|---|---|
| Defining Your Offline Transaction Limits | |
| For Account Range: | 1111222233334444 to 1111222233334444 |
| Profile Identifier: | 000000000017 |

| Magnetic Stripe Image-Usage Control | Best Practice Violation | User Selection |
|---|---|---|
| Determine where card can be used and the types of transactions the card should support. | | Valid for domestic cash transactions<br>Valid for international cash transactions<br>Valid for domestic goods<br>Valid for international goods<br>Valid for domestic services<br>Valid for international services |
| Will your cards be valid at ATMs? | | No |
| Will your cards be valid at terminals other than ATMs? | | Yes |
| If you want to specify the preferred name for the account, please select the preferred alphabet for the account. | | Latin 1 (Western European) |

| Magnetic Stripe Image-Usage Control | Best Practice Violation | User Selection |
|---|---|---|
| Application Identifier for the account | | A0000000031010 |
| Preferred alphabet for the account | | Latin 1 (Western European) |
| Enter the preferred name for the account | | CREDITO DE VISA |
| Enter the selection priority for the account | | 01 |
| Cardholder is required to confirm account selection | | No |
| Enter the preferred language for the account | | English |

*Sample Technical Report:*

| Technical Report for FULLVSDC_ISSUER_CREDITPROFILE01 |  |
|---|---|
| For Account Range: | 1111222233334444 to 1111222233334444 |
| Profile Identifier: | 000000000017 |
| Total Number of Tags: | 26 |

| Data Element | Tag | Category | Length | Best Practice Violation | Value |
|---|---|---|---|---|---|
| Application Default Action | 9F52 | VSDC | 02 | | 0000<br>- No Application Default Action has been set. |
| Application Expiration Date | 5F24 | VSDC | 03 | | 101011 |
| Application Effective Date | 5F25 | VSDC | 03 | | 091011 |
| Application Identifier (AID) | 4F | VSDC | 07 | | A0000000031010 |
| Application Interchange Profile (VSDC) | 82 | VSDC | 02 | | 7C00<br>- Offline Static Data Authentication<br>- Offline Dynamic Data Authentication<br>- Cardholder Verification<br>- Terminal Risk Management<br>- Issuer Authentication |

*Sample Visa Stand-In Report:*

| Visa Stand In Processing Options for FULLVSDC_ISSUER_CREDITPROFILE01 | |
|---|---|
| For Account Range: | 1111222233334444 to 1111222233334444 |
| Profile Identifier: | 000000000017 |

| Processing Options | Report | |
|---|---|---|
| This Issuer (or processor for Issuer) is Full (all chip data) | | |
| Are chip cards issued within any of the account ranges processed under this BIN? | Yes | |

| Stand-in Conditions | Route-To-Issuer Default* | Stand-In Authorization Response Default* |
|---|---|---|
| Transaction exceeds floor limit | No | Approve |
| Transaction selected randomly for online processing | No | Approve |
| Cardholder verification failed | Yes | Decline |
| Unrecognized cardholder verification method | Yes | Decline |
| Exceeded total, domestic, or international counters | Yes | Approve |
| Expired Application | Yes | Decline |
| Application not yet effective | Yes | Decline |
| Issuer Authentication failed on last transaction | Yes | Approve |
| SDA failed | Yes | Decline |
| Offline Data Authentication not performed | Yes | Decline |
| SDA failed on last transaction and was declined offline | Yes | Approve |

*FIG. 48*

SMART CARD PERSONALIZATION ASSISTANCE TOOL

RELATED APPLICATIONS

This application claims priority under 35 USC 119(e) from the Provisional Application No. 60/464,559 entitled "Smart Card Personalization Assistance Tool," which was filed on Apr. 21, 2003, and which is hereby incorporated by reference.

BACKGROUND OF THE INVENTION

1. Field of the Invention

The invention relates to the personalization of smart cards.

2. Description of the Related Art

The present invention is applicable to smart cards. Also termed chip cards, integrated circuit cards, memory cards or processor cards, a smart card is typically a credit card-sized plastic card that includes one or more semiconductor integrated circuits. A smart card can interface with a point-of-sale terminal, an ATM, or with a card reader integrated with a computer, telephone, vending machine, or a variety of other devices. The smart card may be programmed with various types of functionality such as a stored-value application, a credit or debit application, a loyalty application, cardholder information, etc. Although a plastic card is currently the medium of choice for smart cards, it is contemplated that a smart card may also be implemented in a smaller form factor, for example, it may attach to a key chain or be as small as a chip module. A smart card may also be implemented as part of a personal digital assistant, telephone, or take a different form. The below description provides an example of the possible elements of a smart card, although the present invention is applicable to a wide range of types of smart cards.

A smart card may include a microprocessor, random access memory (RAM), read-only memory (ROM), non-volatile memory, an encryption module (or arithmetic unit), and a card reader (or terminal) interface. Other features may be present such as optical storage, flash EEPROM, FRAM, a clock, a random number generator, interrupt control, control logic, a charge pump, power connections, and interface contacts that allow the card to communicate with the outside world. Of course, a smart card may be implemented in many ways, and need not necessarily include a microprocessor or other features.

The microprocessor is any suitable central processing unit for executing commands and controlling the device. RAM serves as temporary storage for calculated results and as stack memory. ROM stores the operating system, fixed data, standard routines, look up tables and other permanent information. Non-volatile memory (such as EPROM or EEPROM) serves to store information that must not be lost when the card is disconnected from a power source, but that must also be alterable to accommodate data specific to individual cards or changes possible over the card lifetime. This information includes a card identification number, a personal identification number, authorization levels, cash balances, credit limits, and other information that may need to change over time. An encryption module is an optional hardware module used for performing a variety of encryption algorithms. Of course, encryption may also be performed in software.

The card reader interface includes the software and hardware necessary for communication with the outside world. A wide variety of interfaces is possible. By way of example, the interface may provide a contact interface, a close-coupled interface, a remote-coupled interface, or a variety of other interfaces. With a contact interface, signals from the integrated circuit are routed to a number of metal contacts on the outside of the card which come in physical contact with similar contacts of a card reader device. A smart card may include a traditional magnetic strip to provide compatibility with traditional card reader devices and applications, and may also provide a copy of the magnetic stripe information within the integrated circuit itself for compatibility.

Various mechanical and electrical characteristics of a smart card and aspects of its interaction with a card reader device are described in *Smart Card Handbook*, W. Rankl and W. Effing, John Wiley & Sons, Ltd., 1997, and are defined by the following specifications, all of which are incorporated herein by reference: *Visa Integrated Circuit Card Specification*, Visa International Service Association, 1996; *EMV Integrated Circuit Card Specification for Payment Systems, EMV Integrated Circuit Card Terminal Specification for Payment Systems, EMV Integrated Circuit Card Application Specification for Payment Systems*, Visa International, Mastercard, Europay, 1996; and *International Standard; Identification Cards—Integrated Circuit(s) Cards with Contacts, Parts* 1-6, International Organization for Standardization, 1987-1995.

To facilitate understanding, FIG. 1 is a block diagram of a prior art system used for the personalization of a smart card. A data preparation table of values 138 and an input file 159 provide input to a preparation processing device 154. The preparation processing device 154 has two-way communications with a hardware security module 130. The preparation processing device 154 provides an output file 160, which provides input to a personalization device 150. The personalization device 150 has two-way communication with a hardware security module 152. A card supplier 170 also provides input to the personalization device 150. The personalization device 150 takes blank smart cards 172 and output personalized smart cards 180.

The data preparation tables are used to specify various options that a card issuer may desire for a smart card such as offline limits, language preferences, and card holder verification methods.

In addition to the encoding and embossing data on a smart card, there may be over forty chip data elements that need to be incorporated into the card personalization process. Some of the mandates for these data elements may be specified in the data preparation table of values 138. The data elements are identified by tag, length, and value.

Previously in order to create such tables, templates have been used to suggest table values for various card preferences. Independent programmers would create a table specifying various values. The programmers would need to know complex details about the table to correctly determine values for the table. Choosing appropriate values for the table is often too confusing and could lead to personalization errors. In addition, the process of choosing appropriate values may become too mired in the technical details, causing the user to lose sight of the business and risk management decisions that should dictate the selection of values. This process may require business people and technical people to complete this process. This may require accurate communication between the technical people and business people to reflect the desired business decisions.

FIG. 2 is a block diagram illustrating in further detail generating a data preparation table of values, used in the prior art. A stand-alone system 190 is an independent computer or computer system. Templates 192 reside on the stand alone system 190. In the alternative, the templates 192 may be a printed document that is referred to by the user of the stand alone system 190. The templates 192 are used as references or suggestions. However, a user might use the stand alone system to create a data preparation table of values 138, ignoring all of the suggestions of the template.

The complex nature of chip card personalization and the ability to generate data preparation table of values that ignore or are contrary to template suggestions has led to discrepancies in the process that in some cases have resulted in interoperability problems. Chip cards issued in one country or region, may experiencing acceptance problems when being used in terminals in other countries and regions, if data in the data preparation table of values is not correct.

A chip card may have base applications already loaded by the chip card manufacturer. The operation of the application is driven by the data elements in the data preparation table of values. The interdependency of data elements may make the process of defining the data elements more complex.

Therefore, the prior art system was difficult to use and provided an output that could cause interoperability problems.

SUMMARY OF THE INVENTION

These and other features of the present invention will be described in more details below in the detailed description of the invention and in conjunction with the following figures.

Member banks need a clear and easy way to tailor their debit/credit applications to best suit their domestic and regional market needs. The current method Members use for selecting and choosing the appropriate values can be confusing and potentially can lead to personalization errors. Too often Members become mired in the technical details and lose sight of the business and risk management decisions that should dictate their application selections. The personalization assistant is a user-friendly tool designed to help Members tailor their VSDC programs to their specific needs and to help to facilitate a seamless migration to chip.

The personalization assistant guides issuers through the decision-making process of selecting their desired debit/credit options. Issuers are requested to respond to a series of business questions. Responses to these questions will be used by the tool to generate a set of debit/credit parameters and values, representing the issuer's business and risk requirements for the debit/credit application. In this document, the set of debit/credit parameters and values is referred to as the "Data Preparation Output File" (or Personalization Assistant Output File).

Throughout the process, the personalization assistant will assist the Member with best practice suggestions, default values, mandatory settings and help screens. The actual mechanics of capturing the data to be used in the data preparation process will be transparent to the Issuer who is then free to focus on the business/risk management aspects of this process. The set of chosen parameters and their values generated by the tool is uniquely identified and retained in a "Member Profile." This Profile can be copied and modified later by the same Issuer in order to create additional profiles that contain parameter or value modifications needed to meet different business requirements.

Once a "Data Preparation Output File" is created, it can be exported for use both in the personalization data preparation process and by the tool used to validate correct personalization of the card's debit/credit application. Various reports of the Issuer's business/risk management decisions can also be displayed noting any deviation from Visa's best practice suggestions. The use of mandatory settings and best practice suggestions will minimize the potential for interoperability problems in both domestic and international markets.

Other features and benefits include the ability to communicate updated information on rules, application best practices, and changes in a timely manner.

BRIEF DESCRIPTION OF THE DRAWINGS

The present invention is illustrated by way of example, and not by way of limitation, in the figures of the accompanying drawings and in which like reference numerals refer to similar elements and in which:

FIG. 10 is a view of a profile listing screen.

FIG. 11 is a view of a page report type page.

FIG. 15 is a view of a default profile web page.

FIG. 16 is a view of a feature selection page.

FIG. 17 is a view of an account data web page for account usage controls.

FIG. 18 is a view of an account data web page for application identification.

FIG. 19 is a view of an account data web page for application confirmation.

FIG. 20 is a view of an account data web page for customizing the account name of the application to be displayed in a specific language.

FIG. 21 is a view of an account data web page for customizing account language.

FIG. 22 is a view of an account data web page for prioritizing the account.

FIG. 23 is a view of an account data web page for account risk management decisions.

FIG. 24 is a view of an offline authorization control web page for offline risk management control.

FIG. 25 is a view of an offline authorization control web page for offline limits and thresholds.

FIG. 26 is a view of an offline authorization control web page for setting account effective date checking.

FIG. 27 is a view of an offline authorization control web page for offline risk management decisions.

FIG. 28 is a view of a web page for cardholder verification method selection.

FIG. 29 is a view of a web age for a PIN Try Limit.

FIG. 30 is a view of a first web page of the CVM Assistant Questionnaire Method 1.

FIG. 31 is a view of a second web page of the CVM Assistant Questionnaire Method 1

FIG. 32 is a view of a cardholder verification method summary web page.

FIG. 33 is a view of a web page for the CVM Method 2.

FIG. 34 is a view of a terminal risk management web page.

FIG. 35 is a view of an offline dynamic data authentication web page.

FIG. 36 is a view of a web page for Offline Data Authentication Risk Management Decisions.

FIG. 37 is a view of a web page for card authentication options.

FIG. 38 is a view of a web page for issuer authentication options.

FIG. 39 is a view of a web page for issuer script risk management decisions.

FIG. 40 is a view of a first web page for a low-value payment feature.

FIG. 41 is a view of a second web page for the low-value payment feature.

FIG. 42 is a view of a third web page for low-value payment.

FIG. 44 is a view of a fifth web page for low-value payment.

FIG. 45. is a view of an output options page.

FIG. 46 is a view of a business report.

FIG. 47 is a view of a technical report.

FIG. 48 is a view of a stand-in options report.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
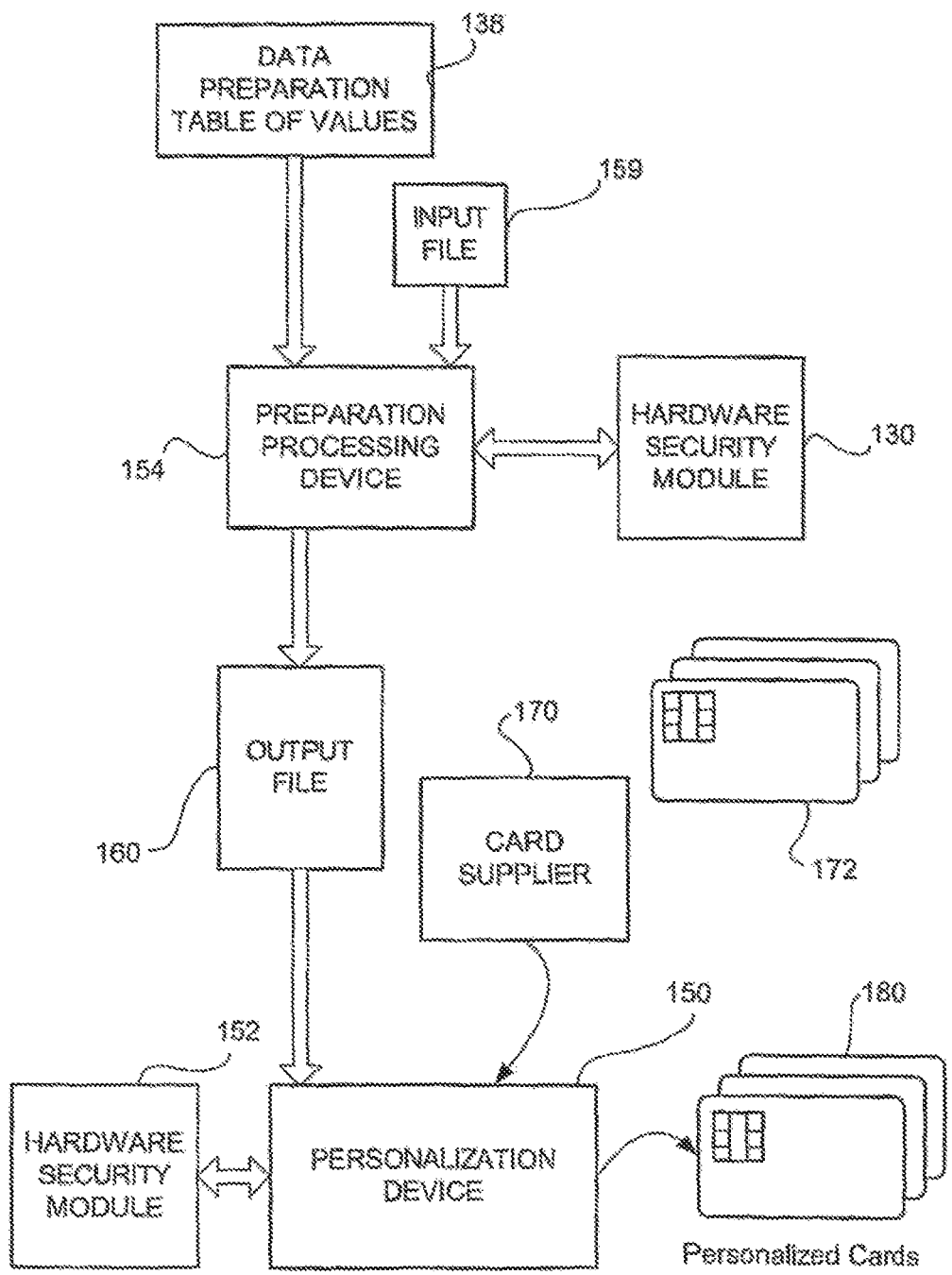
FIG. 1 is a block diagram of a prior art system used for the personalization of a smart card.
Figure 2:
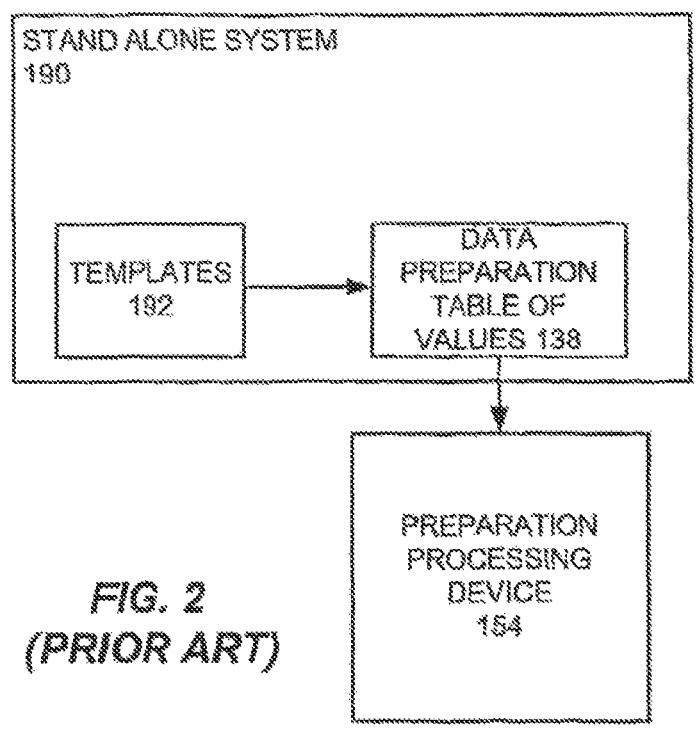
FIG. 2 is a block diagram illustrating in further detail generating a data preparation table of values, used in the prior art.
Figure 3:
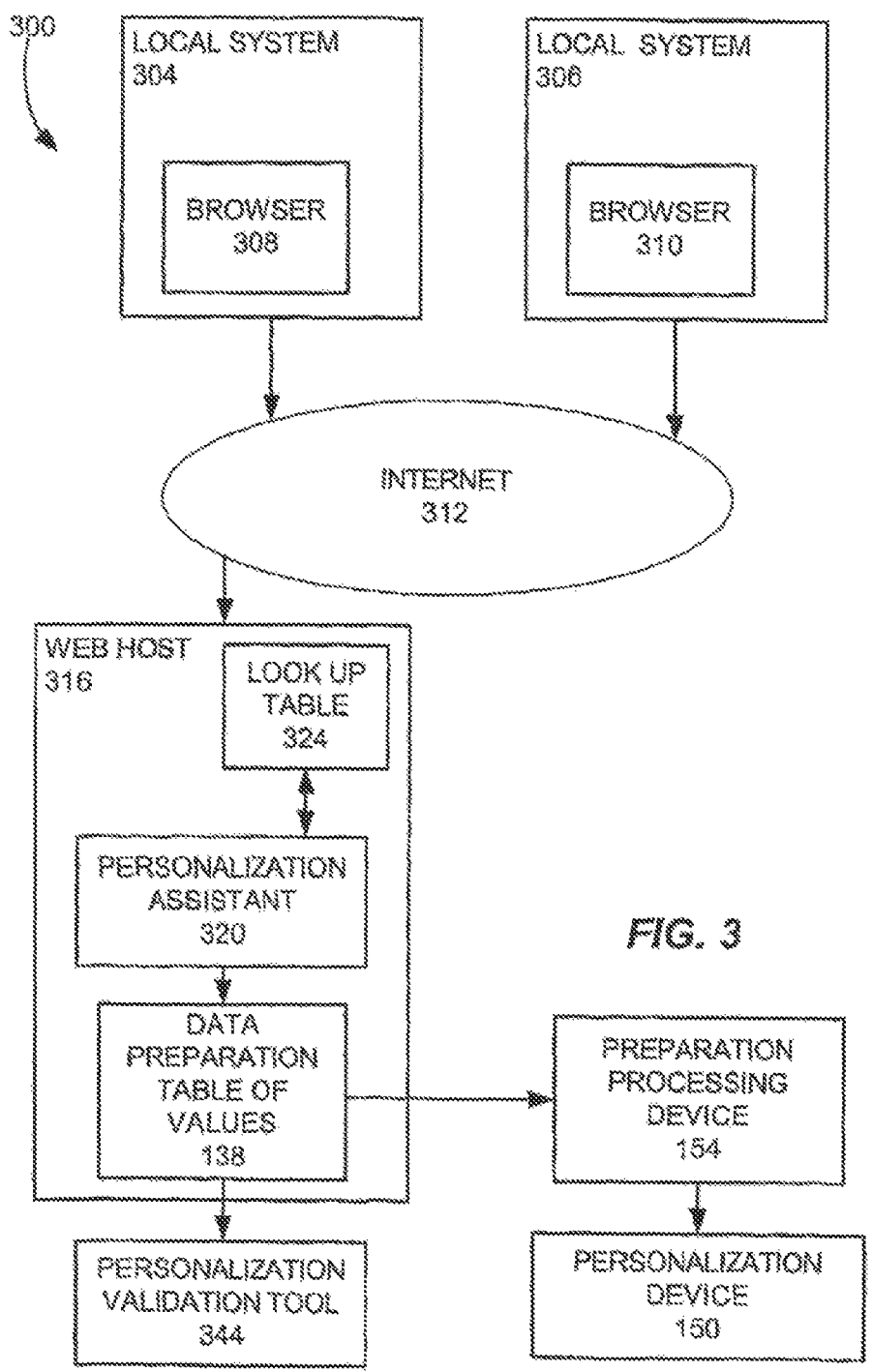
FIG. 3 is a block diagram of a personalization system used in a preferred embodiment of the invention.

FIG. 3 is a block diagram of a personalization system 300 used in a preferred embodiment of the invention. In this system a first local system 304 and a second local system 306 are connected to the Internet 312. A web host 316 is also connected to the Internet 312. The web host 316 includes a personalization assistant software application 320 (or "personalization assistant tool"). The personalization assistant software application 320 includes or is in communication with a look up table 324. The web host 316 is connected to a preparation processing device 154 and a personalization validation tool 344.

In an alternative embodiment, the data preparation table of values is stored on the local systems 304, 306. In such a case, the local systems 304, 306 may be connected to the preparation processing device and may send the data preparation table of values to the preparation processing device 154. In such a case, approved data preparation table of values may have an indicator of whether they are approved, with the preparation processing device only accepting approved data preparation of values.

Figure 4:
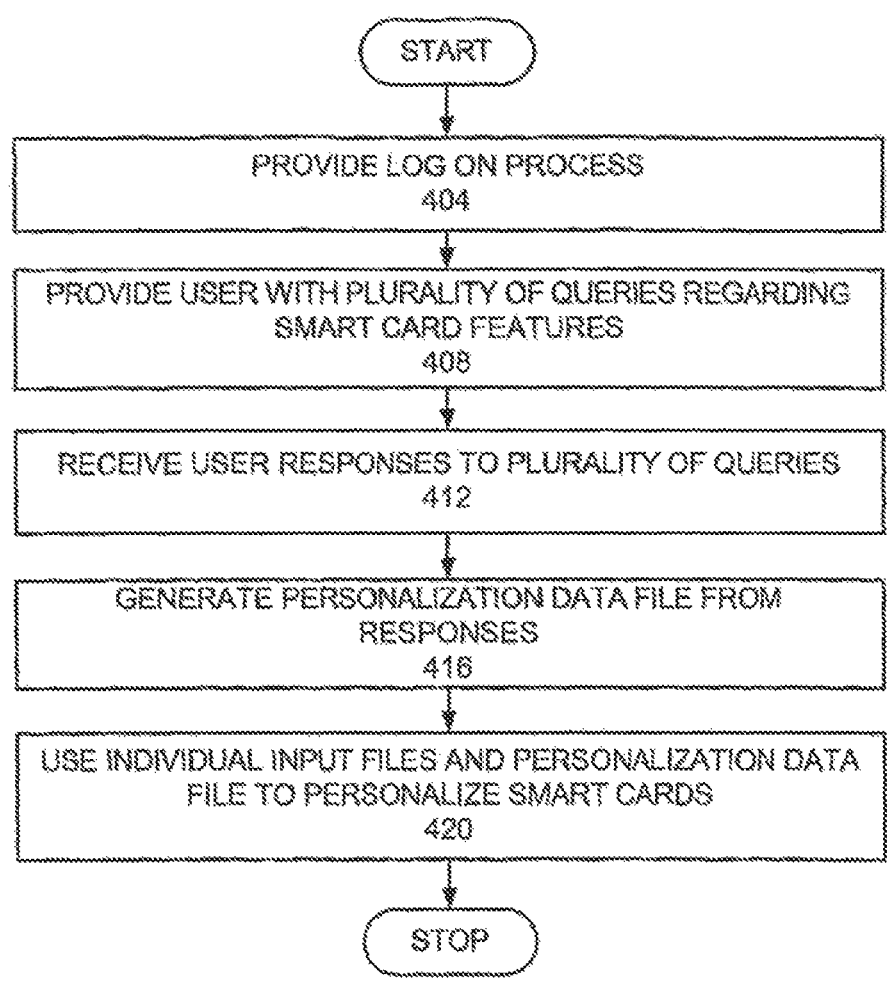
FIG. 4 is a high level flow chart of a process used by the personalization system.

FIG. 4 is a high level flow chart of a process used by the personalization system 300. The web host 316 provides a log on screen to users of the local systems 304, 306 (step 404). After the users of the local system 304, 306 successfully log on, the web host 316 provides users of the local systems 304, 306 with a plurality of queries regarding smart card features (step 408). The users of the local systems 304, 306 provide responses to the queries. The responses to the plurality of queries are received by the web host 316 (step 412). The web host 316 generates a personalization data file from the responses to the plurality of queries (step 416). In this embodiment, the personalization data file is sent to a preparation processing device 154, which uses individual input files and the personalization data file to generate a plurality of personalized smart cards (step 420). In one implementation, the preparation processing device 154 does this by generating an output file from the personalization data file and the individual input files. The output file is then sent to a personalization device, which uses the output file to generate personalized smart cards. In another implementation, the preparation processing device performs the actual personalization on the smart cards. In other embodiments, the web host may be able to generate the smart cards.

The sending of the plurality of queries (step 408) may occur simultaneously with the receiving user responses (step 412). This may be done by sending one or more queries at a time and then receiving responses before sending one or more additional queries.

Figure 5:
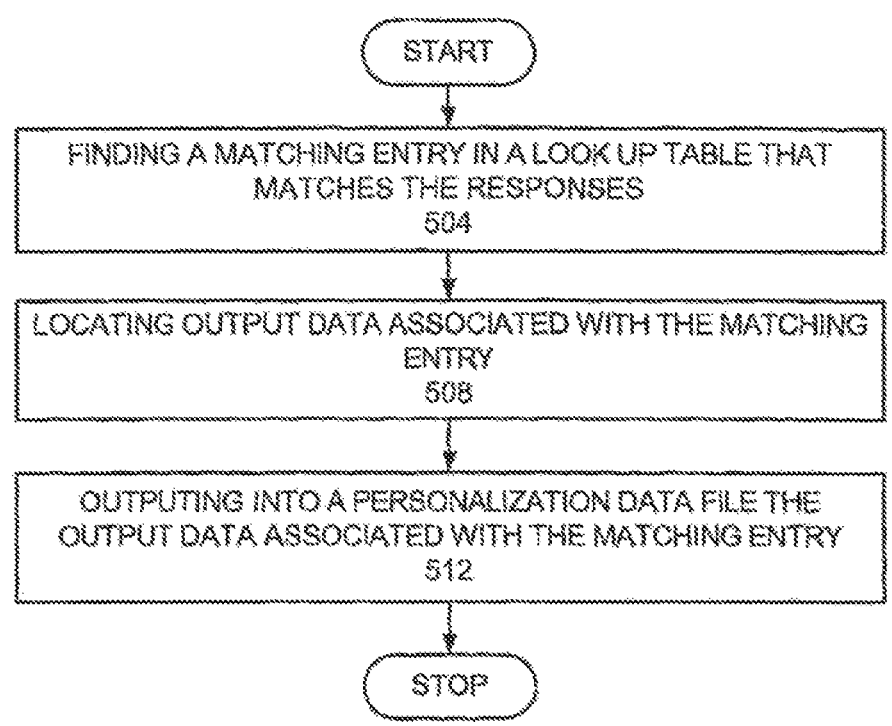
FIG. 5 is a more detailed flow chart of a step of generating a personalization data file from the responses to the plurality of queries for an embodiment using a lookup table.

FIG. 5 is a more detailed flow chart of the step of generating the personalization data file from the responses to the plurality of queries (step 416) for an embodiment using a lookup table. During this step the personalization assistant finds a matching entry in the look up table 324 that matches the responses to the plurality of queries (step 504). The look up table may be a table of entries, where each entry is a possible combination of response to the plurality of queries. The look up table 324 associates each entry with output data. The output data associated with the matching entry is then located (step 508). The output data associated with the matching entry is then outputted into a personalization data file (step 512).

Some embodiments may use some programming logic in addition to a look up table to generate the data preparation table of values. Other methods not using a look up table may be used to generate the data preparation table of values. Such other methods may use a knowledge based system with artificial intelligence or some other system.

Figure 6:
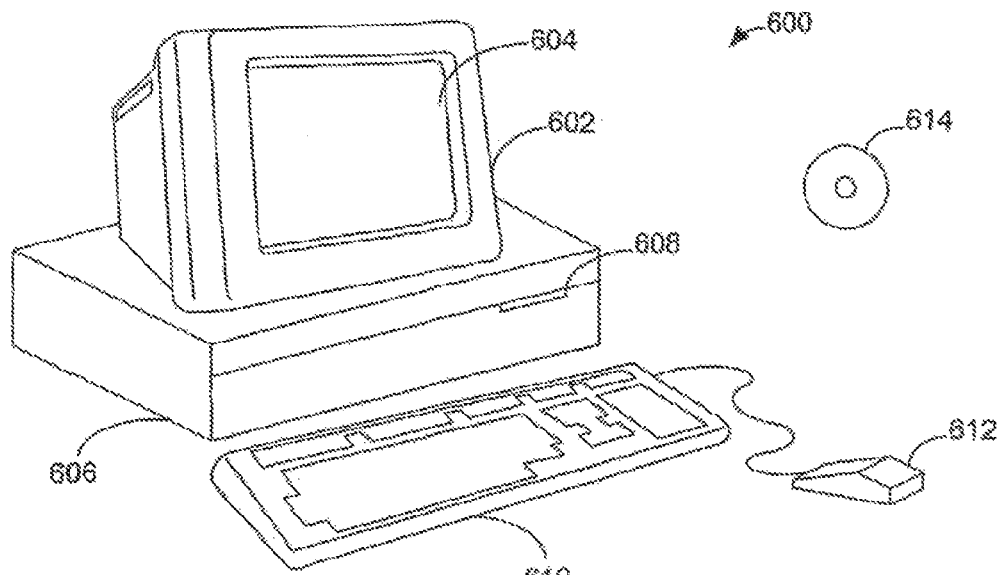
FIGS. 6 and 7 illustrate a computer system, which is suitable for implementing the web host or local systems used in embodiments of the present invention.
Figure 7:
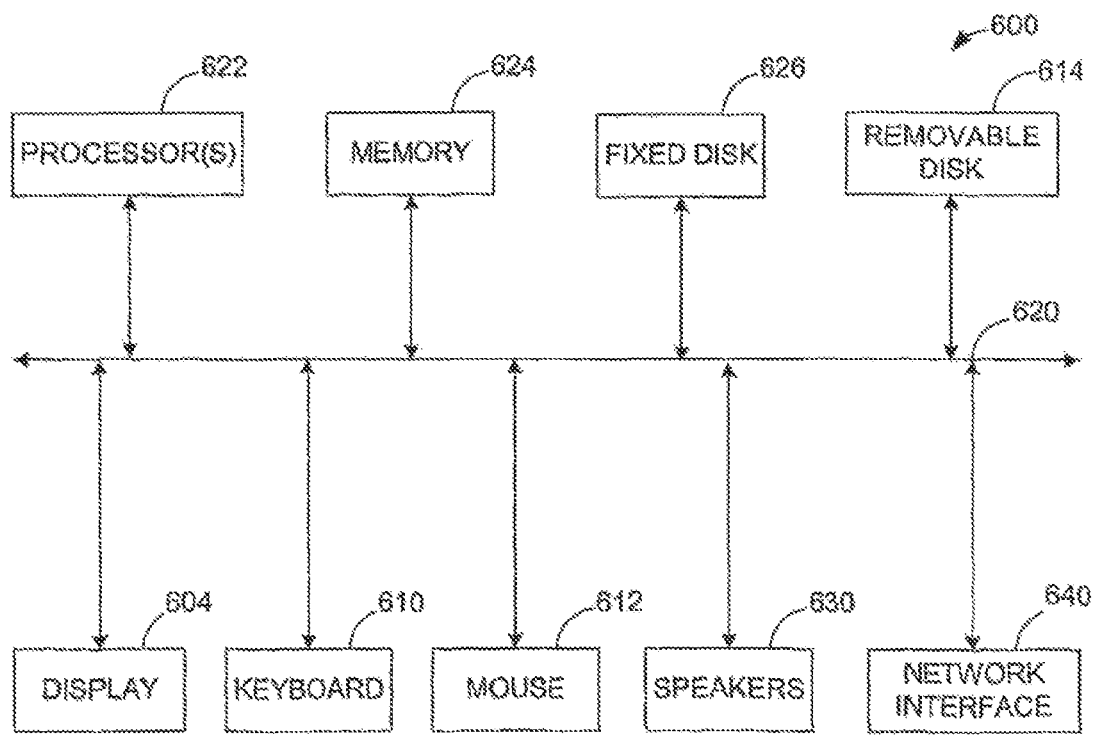

FIGS. 6 and 7 illustrate a computer system 600, which is suitable for implementing the web host or local systems used in embodiments of the present invention. FIG. 6 shows one possible physical form of the computer system. Of course, the computer system may have many physical forms ranging from an integrated circuit, a printed circuit board, and a small handheld device up to a huge super computer. Computer system 600 includes a monitor 602, a display 604, a housing 606, a disk drive 608, a keyboard 610, and a mouse 612. Disk 614 is a computer-readable medium used to transfer data to and from computer system 600.

FIG. 7 is an example of a block diagram for computer system 600. Attached to system bus 620 is a wide variety of subsystems. Processor(s) 622 (also referred to as central processing units, or CPUs) are coupled to storage devices, including memory 624. Memory 624 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 626 is also coupled bi-directionally to CPU 622; it provides additional data storage capacity and may also include any of the computer-readable media described below. Fixed disk 626 may be used to store programs, data, and the like and is typically a secondary storage medium (such as a hard disk) that is slower than primary storage. It will be appreciated that the information retained within fixed disk 626 may, in appropriate cases, be incorporated in standard fashion as virtual memory in memory 624. Removable disk 614 may take the form of any of the computer-readable media described below.

CPU 622 is also coupled to a variety of input/output devices, such as display 604, keyboard 610, mouse 612 and speakers 630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 622 optionally may be coupled to another computer or telecommunications network using network interface 640. With such a network interface, it is contemplated that the CPU might receive information from the network, or might output information to the network in the course of performing the above-described method steps. Furthermore, method embodiments of the present invention may execute solely upon CPU 622 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

EXAMPLE

Figure 8:
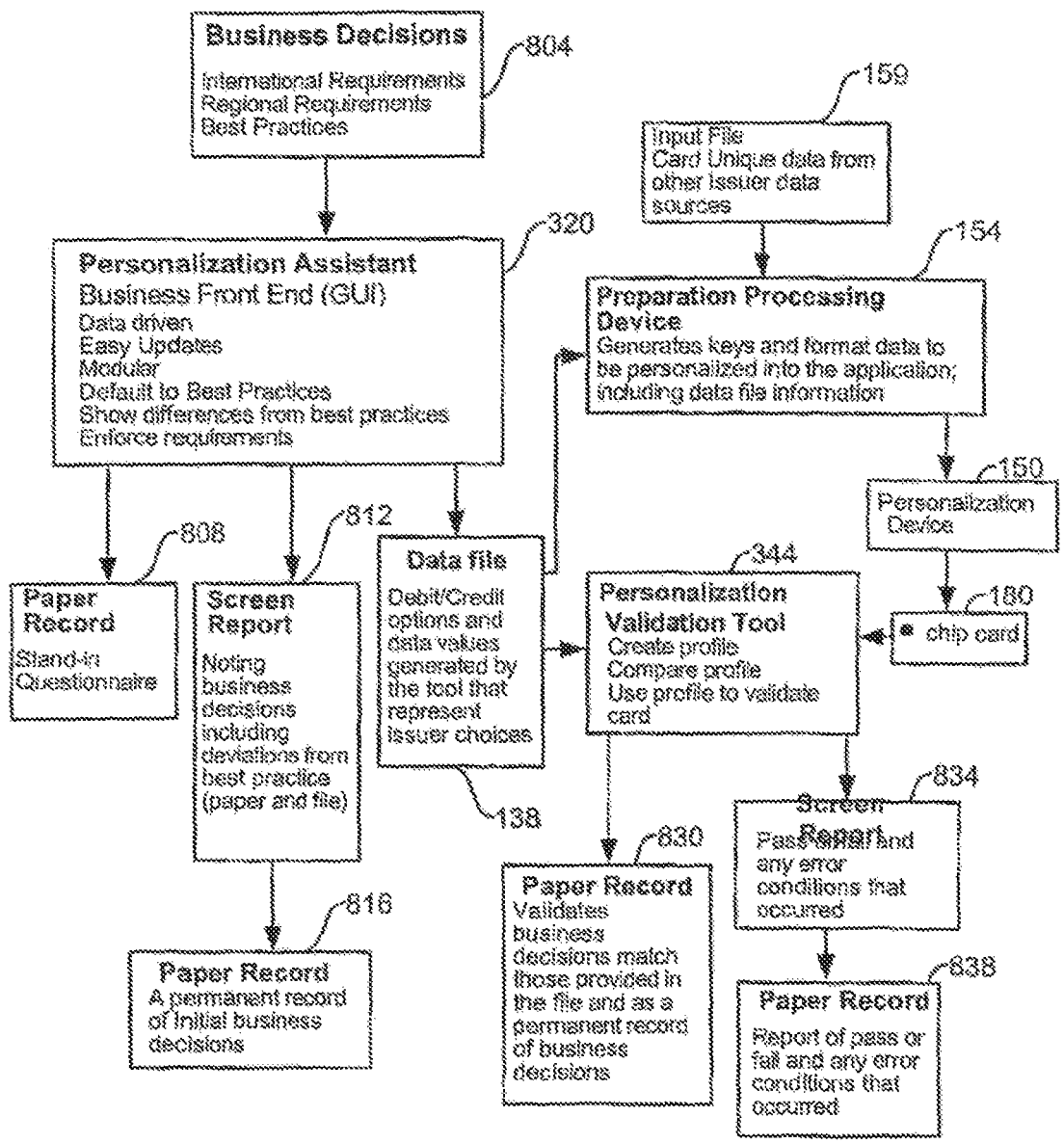
FIG. 8 is a block diagram of an example of an embodiment of the invention.

FIG. 8 is a block diagram of an example of an embodiment of the invention. A responses to a plurality of queries form business decisions 804, which are provided as input to the personalization assistant 320. The personalization assistant creates a data file (or data preparation table of values) 138. The personalization assistant 320 may also be used to create a paper record 808 and screen report 812, which may be used to form another paper record 816. The data file 138 and an input file 159 are inputted into a preparation processing device 154 to provide an output file, which is sent to a personalization device 150. The personalization device 150 uses the output file to personalize a chip card 180. Generally, a single data file with a plurality of input files may be used to provide one or more output files used to personalize a plurality of smart cards. A personalization validation tool 344 may be used to compare the data file 138 with the smart card 180 to validate the smart card. The personalization validation tool 344 creates a validation paper record 830 to validate business decisions and a screen report 834 designating if the smart card 180 contains data that violates rules or best practices defined by the card scheme. The screen report 834 may be used to provide a paper record 838.

In an example of a process in an embodiment of the invention, to proved a log on process (step 404) a log-on web page is provided by the web host that would allow a user to log on to the web host (step 404). The log on web page requests a users username and password. This provides security, that keeps users from viewing or changing other user's data. Once logged in the user may be presented with a home page that allows the user to select the personalization assistant and run the personalization assistant application. Running the personalization assistant application may provide an Early/Full Data Options Decision page. This page allows the user to indicate the appropriate data options that apply to both the issuer host environment and the domestic acquiring environment of the user. For an issuer, if an issuer is not able to receive all of the chip data then the Early Data Option is selected. This selection limits the Issuer in the amount of chip data they are able to receive. For an issuer, if the issuer is able to receive all of the chip data then a Full Data Option is selected. The issuer receives all of the chip data fields. Similarly, an Early Acquirer truncates a message only sending some of the fields of data for an Early Data Option, and sends a full message with all of the data fields if a Full Data Option is selected. The inventive personalization tool is able to provide different best practices recommendations depending on whether an early or full environment is used.

The user is then brought to a business profile selection menu, which allows a user to build a new member profile or to select an existing member profile, only if a new profile has been previously created. Another option allows the user to select a recommended profile. If the user chooses to build a new member profile from an existing member profile, then a profile listing screen 1004, as shown in FIG. 10, is provided. The profile listing screen 1004 allows a user to select any of the listed profiles 1008 and then choose a button to modify a profile 1012, a button to view details of the profile 1016, a button to add a profile 1020, or a button to search profiles 1024.

Figure 11:
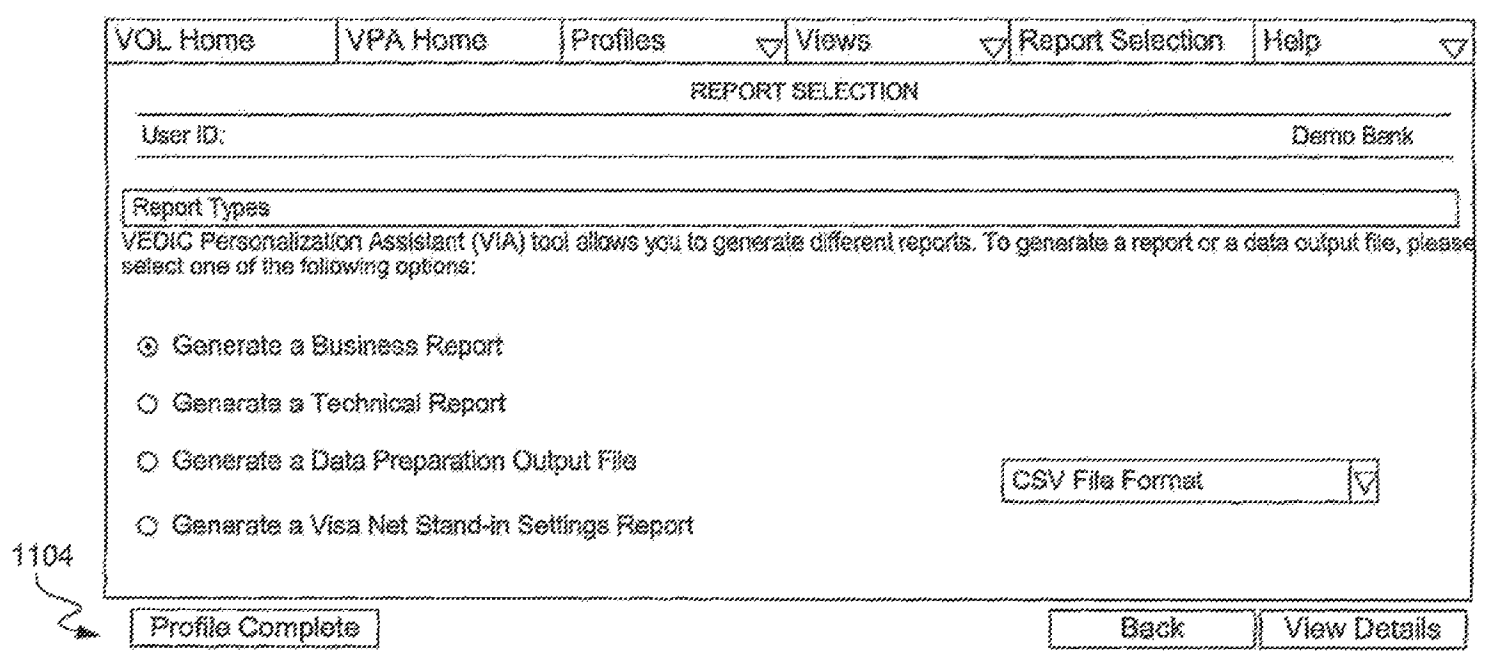

If the user selects the button to view details of the profile 1016, then a page report type page 1104 is provided, as shown in FIG. 11. The report type page 1104 allows a user to choose to generate a business report, generate a technical report, generate a data preparation output file, or generate a stand-in settings report.

Figure 12:
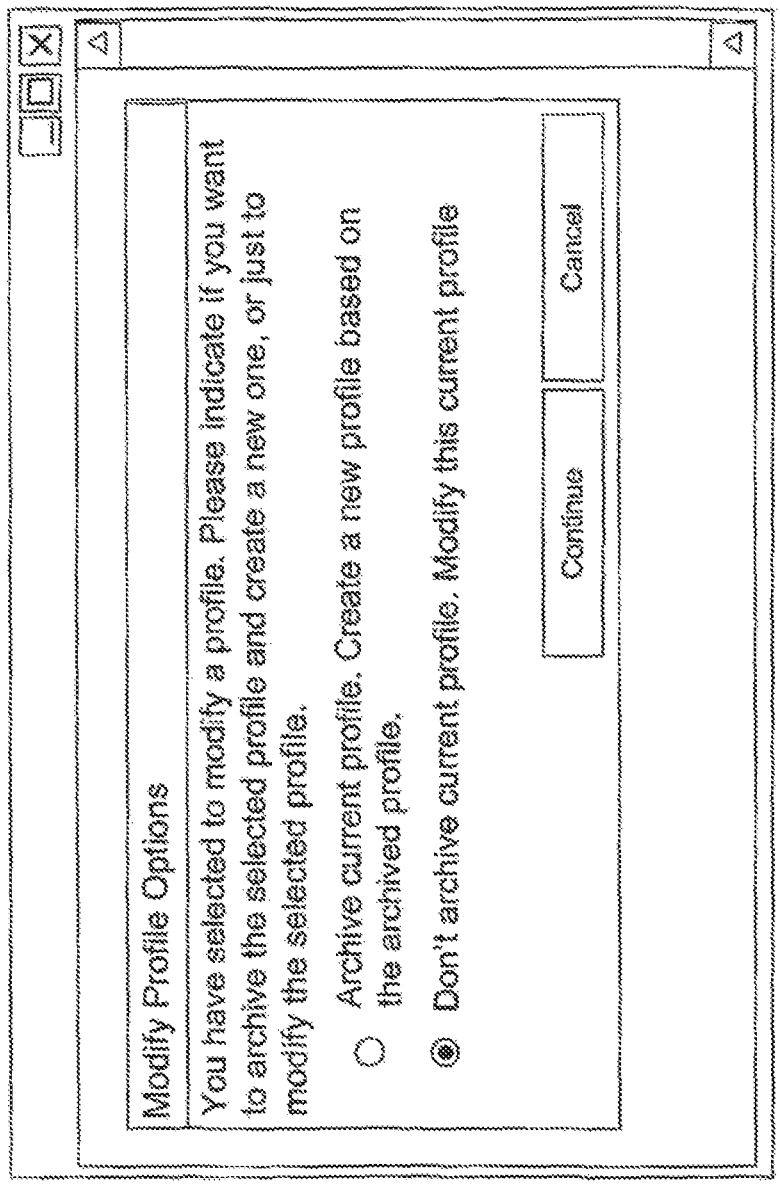
FIG. 12 is a view of a modify profile option page.

If a user selects the button to modify a profile 1012, a pop-up window would be displayed in case the selected profile contains best practice violations. The user is asked to confirm whether he/she wants to continue with the profile, or cancel the selection. If the selected profile doesn't contain any best practice violation, a modify profile option page 1204 is provided, as shown in FIG. 12. The modify profile option page 1204 provides the options of either archiving the current profile and creating a new profile based on the archived profile, or not archiving the current profile and modifying the current profile. It should be noted that profiles that are modified by a user will remain in a pending state until a member user who has supervisor privilege can change the profile status to "active". On making the appropriate selection the user would click on the Next button.

Figure 13:
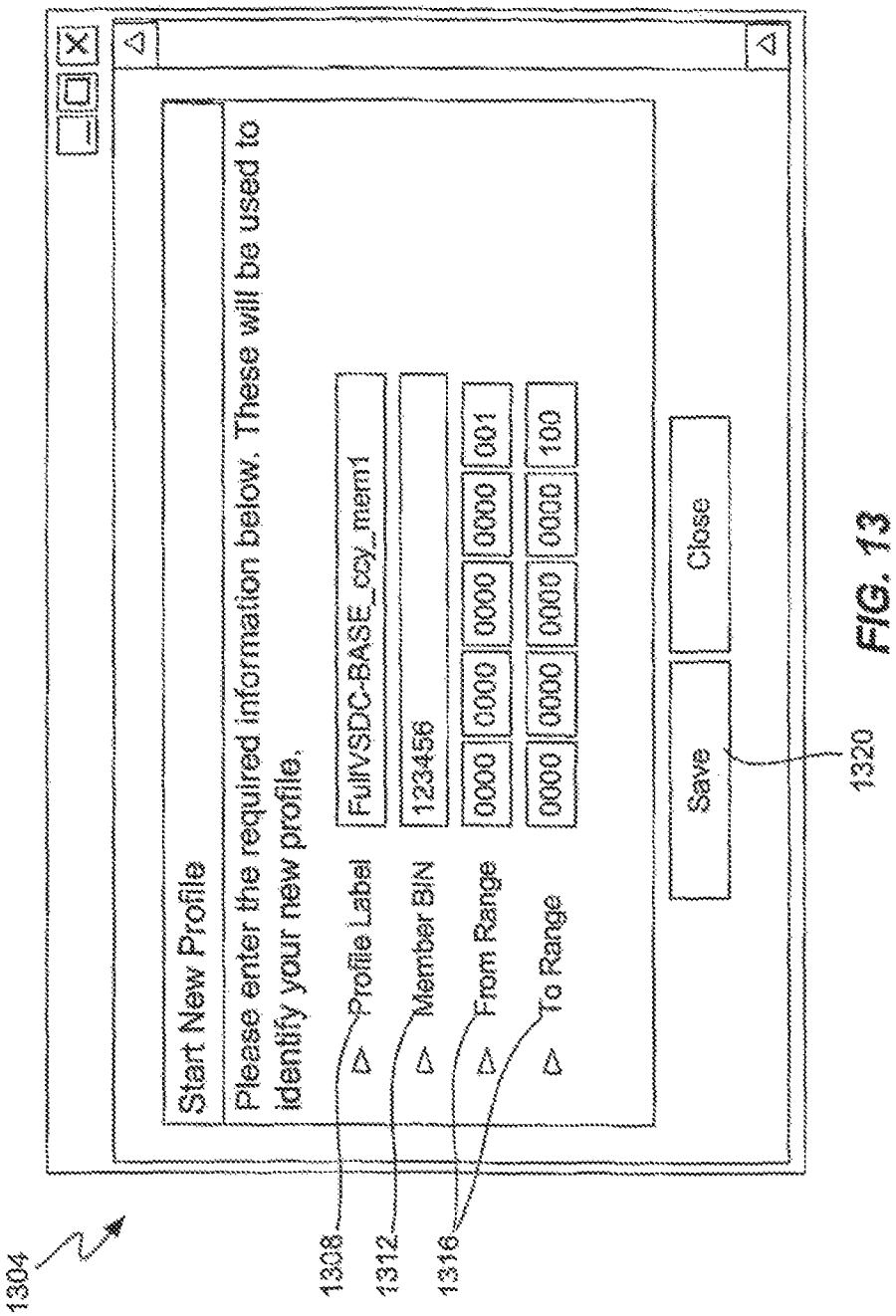
FIG. 13 is a view of a start new profile page.

If a user selects the button to add a profile 1020, a start new profile page 1304 is provided, as shown in FIG. 13. The start new profile page 1304 queries the user for a profile label 1308, a bank identification number (BIN) 1312, and an account range 1316. The new profile will remain in a pending state until a member user who has supervisor privilege can change the profile status to "active". After all requested information has been entered, the user should click on the "Next" button 1320 to proceed to the next screen. The next screen provides the user with a summary of selected smart debit/credit card features.

Figure 14:
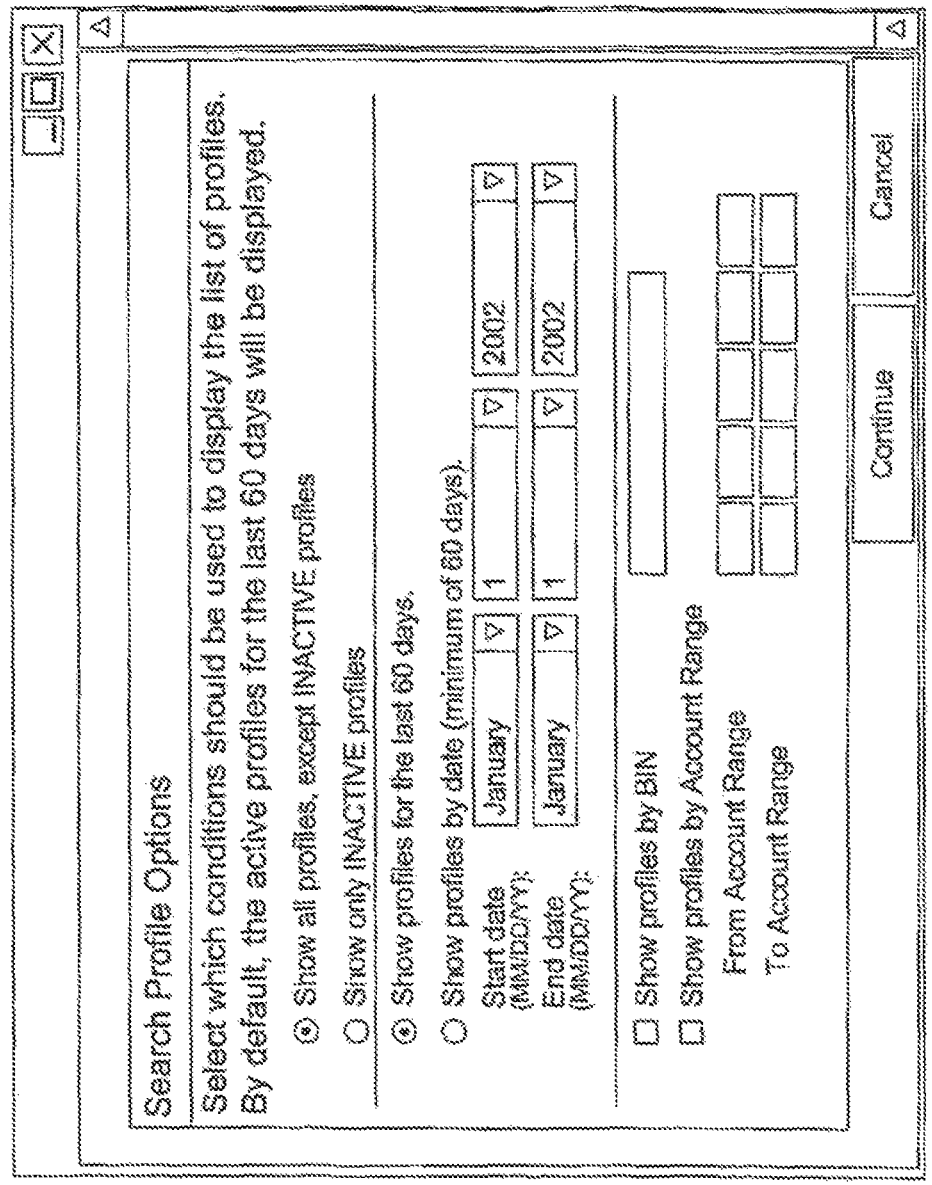
FIG. 14 is a view of a search profile page.

If a user selects the button to search profiles 1024, a search profile page 1404 is provided, as shown in FIG. 14. The search profile page 1404 allows a user to search from a list of active or inactive profiles over a period defined by the user. The user may search by bank identification number (BIN) or account range. To perform a search, a user would enter the required information and then click on the continue 1408 button.

Figure 15:
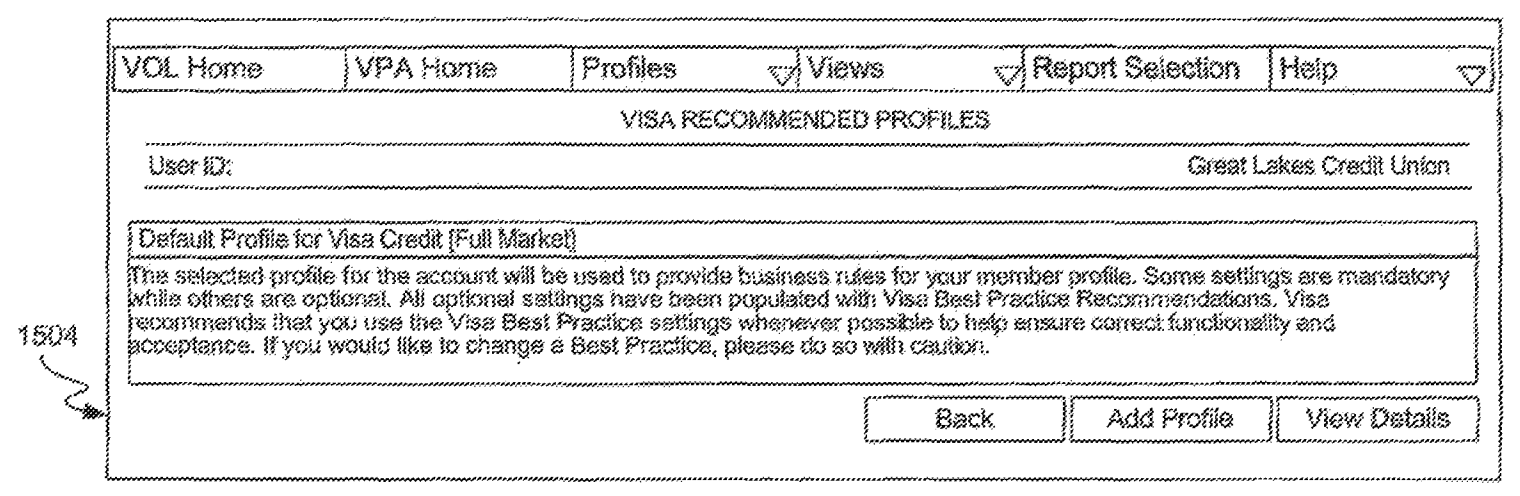

If in the business profile selection menu the user selects the use of a recommended profile, a default profile web page 1504 is provided, as shown in FIG. 15. The default profile web page 1504 provides the options of viewing the details of the default profile and creating a new profile based on the default profile.

Figure 9:
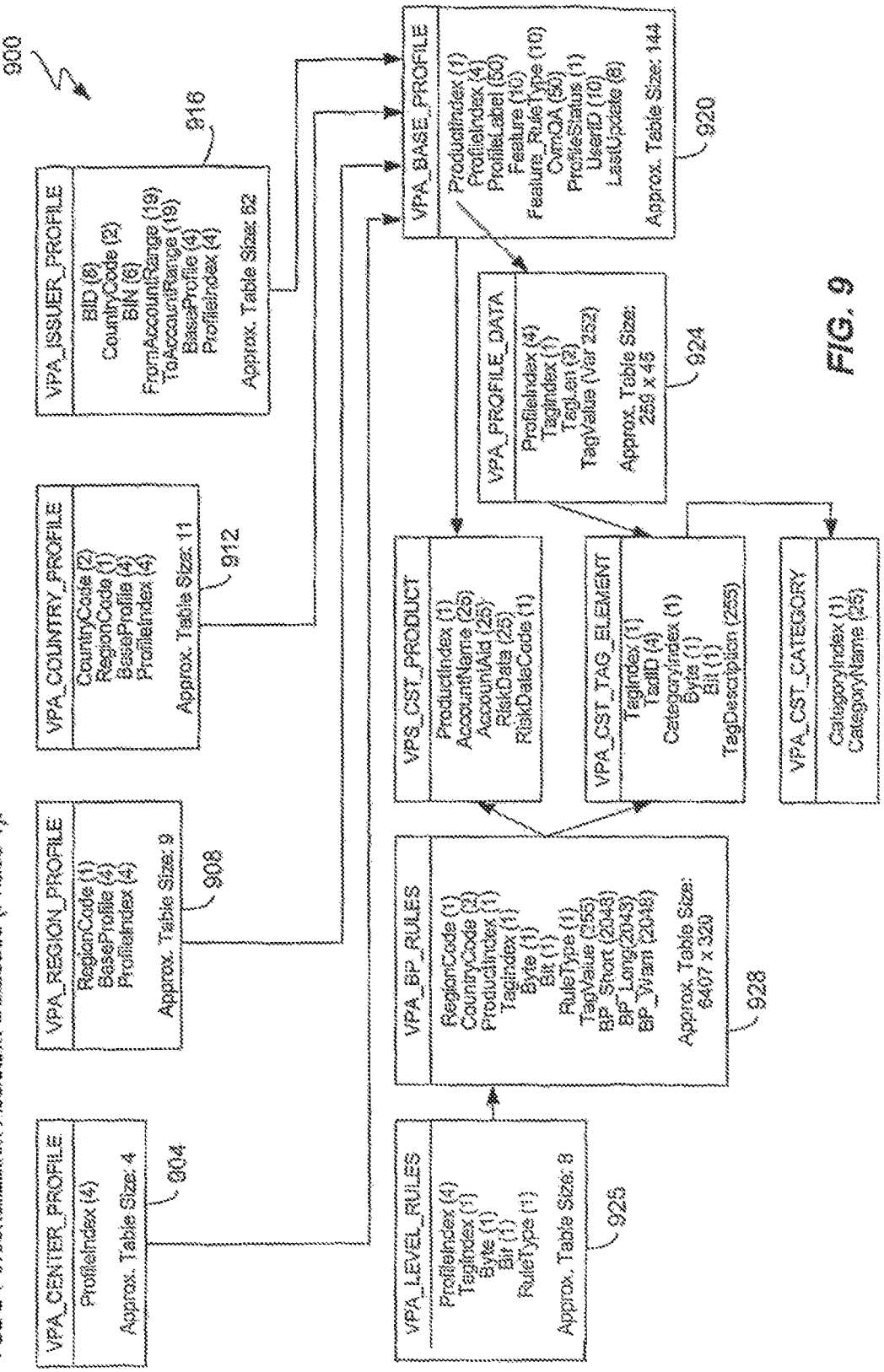
FIG. 9 is a block diagram of an example of a personalization database.

FIG. 9 is a block diagram of an example of a personalization database 900. The personalization database provides a hierarchy of profiles that is used to provided default and recommended profiles. A universal personalization assistant center profile database 904 is provided. The universal center can maintain multiple profiles per product. These profiles may be used as default and recommended profiles. The profiles may be used globally for all regions. A personalization assistant regional profile database 908 is provided. Usage is divided into several regions. Each region may contain several countries. One region may be Latin America and the Caribbean. Each region would take one or more of the recommended or default profiles in the universal personalization assistant center profile database 904 and tailor the one or more default or recommended profiles according to regional preferences and requirements and place these as default and recommended profiles in the personalization assistant regional profile database 908. A personalization assistant country profile table 912 is provided. An example of a country in the Latin America and the Caribbean region is Brazil. Each country would take one or more of the recommended or default profiles in the personalization assistant region profile database 908 and tailor the one or more default or recommended profiles according to country preferences and requirements and place these as default and recommended profiles in the personalization assistant country profile database 912. Each country can have multiple country/domestic profiles associated to it, identified by the country and region code. If a country is in a region that does not have default or recommended profiles, then the country may use the global profiles. An issuer profile table 916 is provided. Each issuer can have multiple issuer profiles associated to it, identified by the business identification, country code, account range, and profile identification. The issuer would take one or more of the recommended or default profiles in the personalization assistant country profile database 912 and tailor the one or more default or recommended profiles according to issuer preferences and requirements and place these as default and recommended profiles in the personalization assistant issuer profile database 916. The base profile table contains a list of all profiles and configurations for international, regional, country, and issuer profiles. The personalization assistant base profile table 920 provides input for a personalization assistant profile data table 924. The personalization assistant profile data table contains a list of all tags and values associated to it. Each profile has mandatory, recommended, and default settings or values for the various features or functions and tag lengths and values that correspond to the setting or values for the profile.

A personalization assistant level rules table 925 is provided. The personalization assistant level rules table 925 contains a list of all tags and values associated with every level profile and stores the rules per profile. The personalization assistant level rules table 925 provides input to a personalization assistant BP rules table 928.

On completion of the profile selection process that defines the default profile to be used for building a new profile, the personalization assistant application presents a user with a feature selection page 1604, as shown in FIG. 16. This page outlines the mandatory features that must be supported by an issuer along with optional features that users can select or deselect. Some of the mandatory features listed are "Account Data," Cardholder Verification Methods" (CVMs), "Terminal Risk Management," and "Card Authentication." These items as shown, are not next to a check box, since they cannot be selected or deselected, since they are mandatory. Optional features listed are "Offline Authorization Controls," "Offline Static Data Authentication" (SDA), "Offline Dynamic Data Authentication" (DDA), "Issuer Authentication," "Issuer-Script Processing," and "Visa Low-Value Payment" (VLP). These items as shown, are next to a check box to allow a user to select or deselect the optional feature. The personalization assistant tool has some of the check boxes for the optional features pre-checked, where the pre-checked items are either built in recommendations or best practices. If a user deselects a pre-checked item, the personalization assistant tool provides a warning window that informs the user that they are about to violate a recommendation or best practice and asks if they are sure if they want to do that. As a result, the personalization assistant tool is able to provide mandatory features and optional features with implemented recommendations and best practices.

If during the selection or deselection of a feature or function, the user changes an option that results in a violation of current best practice, the personalization assistant provides a warning box to the user, to alert the user to the violation. The following screens depend on the features selected by a user. In this example, it is presumed that all features have been selected. On this web page and all subsequent web pages that appear during the feature and function selection process, the user may at any time click on the "Profile Complete" button 1608, to complete the profile building process; the "Save" button 1612, to save current setting and remain on the current screen; the "Back" button 1616, to return to the previous screen; the "Next" button 1620, to save current settings and to proceed to the next screen; or the "Cancel" button 1624 cancel all settings selected by the user on this page.

Account Data

FIG. 17 is a view of an account data web page for account usage controls 1704. This page allows a user to define where a card may be used geographically (internationally only, domestically only, or both internationally and domestically) for each of the services provided by the card, i.e. goods and services, cash and cash back. In the case either domestic or international usage is checked (i.e. not both are checked), the system will pop up a question asking if the card will support a geographic restriction check. The user may also define if the card can be used at Automatic Teller Machines (ATM) and at devices other than ATMs, such as point of sale devices.

FIG. 18 is a view of an account data web page for application identification 1804. For issuers who choose to have more than one credit or debit application, using the same application identifier for each, this page allows a user to uniquely identify each of these applications using additional information referred to as the application identifier extension.

FIG. 19 is a view of an account data web page for application confirmation 1904. This page allows the user to indicate whether there are multiple payment applications on the card. If multiple applications are present, the user has the option on this screen to set the current configure application to require that the cardholder confirm the application's use before a transaction is performed. If confirmation is not requested then a terminal would select an application with the highest priority, without requesting confirmation.

FIG. 20 is a view of an account data web page for customizing the account name of the application to be displayed in a specific language 2004. This page allows the account name of the application to be displayed in a specific language to be customized so that in the event a terminal supports the language of choice, the account name would be displayed to the cardholder in that language.

Figure 21:
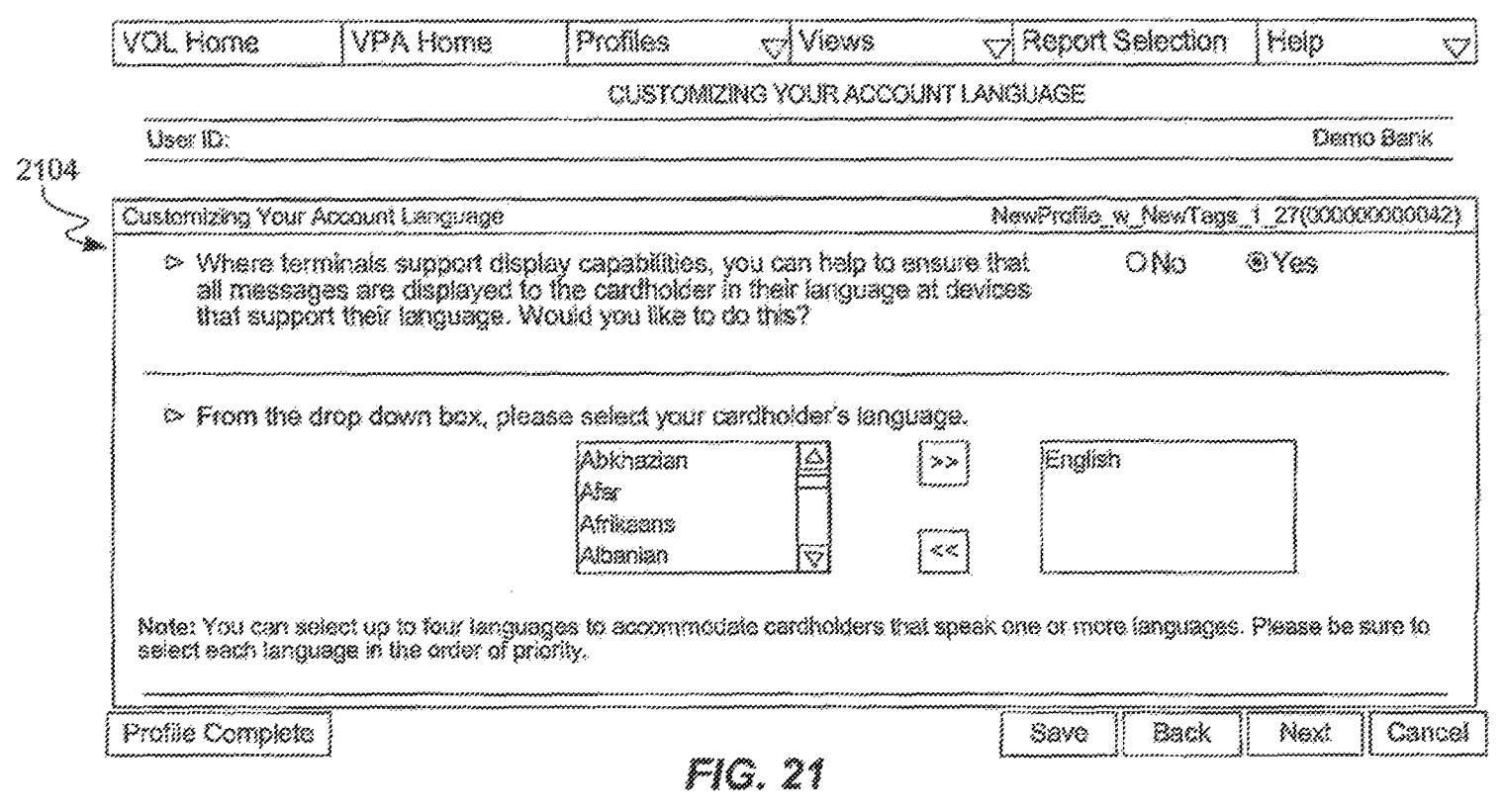

FIG. 21 is a view of an account data web page for customizing account language 2104. The page, in this example, allows the issuer to define up to four languages of choice, so that in the event a terminal in use supports any of these languages, the display messages provided by the terminal will be displayed in the chosen language.

FIG. 22 is a view of an account data web page for prioritizing the account 2204. This page allows a user to set a required priority order by which a terminal should select an application, assuming that multiple payment applications are being supported on the card.

Figure 23:
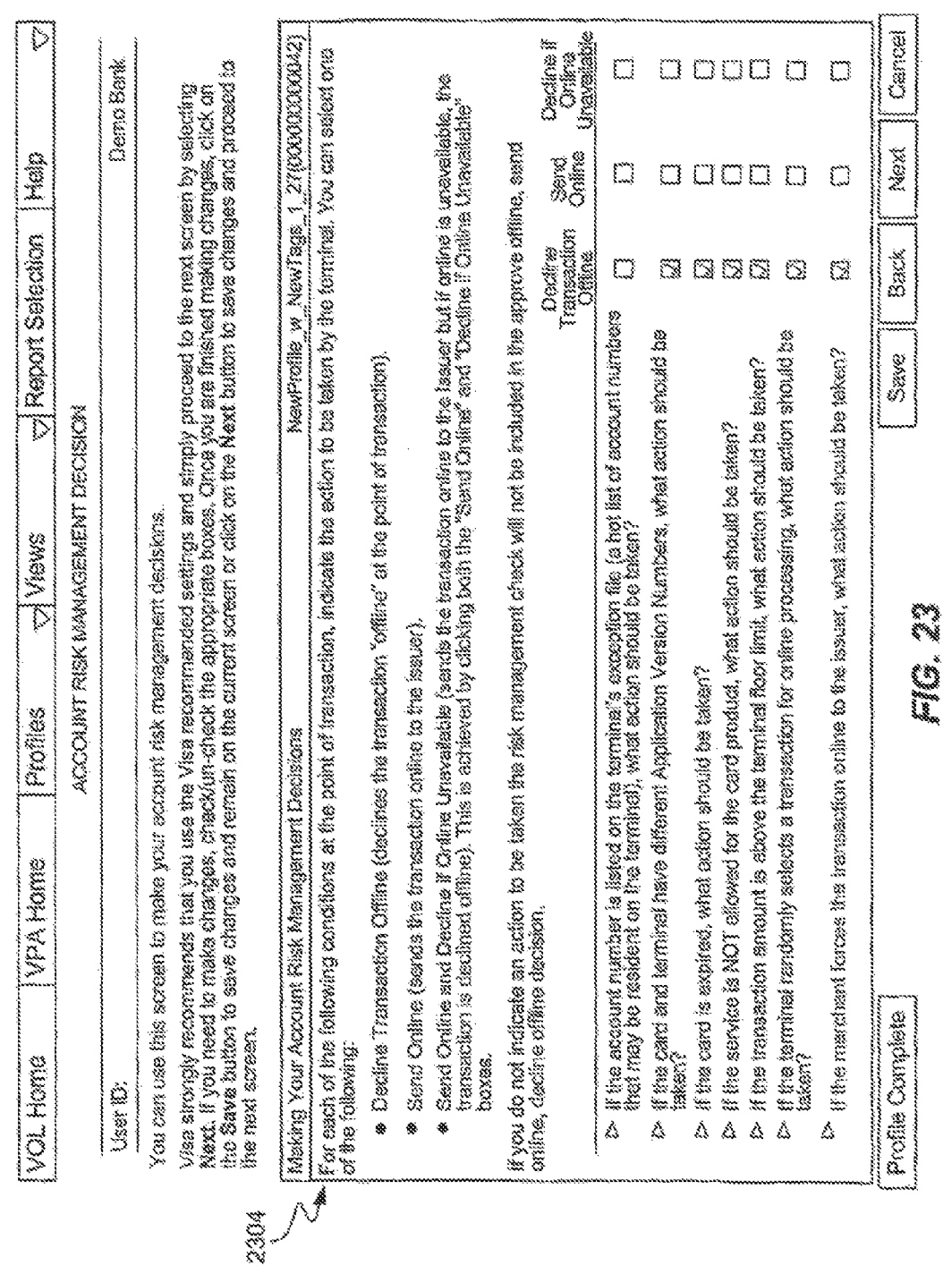

FIG. 23 is a view of an account data web page for account risk management decisions 2304. This page allows a user to set either decline offline, send online, or decline options, if online unavailable for various risk management results that may be detected by a terminal during transaction processing. For example, if a terminal determines that a card is expired an issuer may choose to have the card declined offline at the point of transaction, or send the transaction online to the issuer, or to send the transaction online to the issuer but decline offline if an online connection is unavailable. If the terminal is not able to connect online or the connection is down, the decline if online unavailable option would decline the card offline.

Offline Authorization Control

FIG. 24 is a view of an offline authorization control web page for offline risk management control 2404. This page allows a user to specify whether the card, terminal or both should perform risk management checks.

FIG. 25 is a view of an offline authorization control web page for offline limits and thresholds 2504. This web page allows the user to select appropriate counter limits, amount limits, secondary currency definitions, etc. that are required for card and terminal velocity checking. For example an offline limit may provide that a maximum of three offline transactions may occur before an online transaction is required and the number of consecutive offline transactions that are allowed before declining a transaction when an online transaction cannot be completed. In this example, a mandatory requirement is placed so that the issuer must allow at least two offline transactions between online transactions. Threshold limits may be set on offline international transactions and amount limits FIG. 26 is a view of an offline authorization control web page for setting account effective date checking 2604. This page allows the user to determine if an application effective date is required on the account and the action to be taken if a cardholder attempts to use the card before the account date becomes effective. The options, in this example, are to decline the transaction offline, send the transaction online, or send the transaction online but decline if an online connection is not available.

FIG. 27 is a view of an offline authorization control web page for offline risk management decisions 2704. This page allows a user to set either decline offline, send online, or decline if online unavailable options for various offline risk management results that may be encountered by a terminal during transaction process. Examples include; if the card is new, if card data is missing, and if the lower and upper limits specified by the user for offline use have been exceeded. For example, an offline limit may provide that a maximum of three offline transactions may occur before an online transaction is required.

Card Verification Methods

FIG. 28 is a view of a web page for cardholder verification method selection 2804. The page provides a user with a choice of two methods for preparing the user's cardholder verification methods list. A Method 1 option offered by the web page provides a series of questions. Based on the user's response to the question the personalization assistant generates an appropriate cardholder verification method list. A Method 2 option offered by the web page allows a user to create the user's own cardholder verification method list. Under Method 2, a review is made of the cardholder verification method list before the profile is activated. If either method indicates offline PIN support, a user will be provided by a PIN Try Limit web page 2904, as shown in FIG. 29, to allow the entry of the PIN Try Limit and the action to be taken in event a cardholder exceeds the PIN Try Limit during transaction processing.

If Method 1 is selected, a Card Verification Method Assistant Questionnaire Method 1 process is performed. A first web page of the CVM Assistant Questionnaire Method 1 3004 is shown in FIG. 30. This page allows a user to indicate if they require separate CVM lists for domestic and international transactions. This allows the support of two CVM lists on a single application.

A second web page of the CVM Assistant Questionnaire Method 1 3104 is shown in FIG. 31. Some of the questions on this page are: Will you allow your cardholder to be validated using offline plaintext PIN? Will you allow your cardholder to be validated using offline Enciphered PIN? At ATMs supporting both offline PIN and online PIN, should offline PIN be used instead of online PIN?

A cardholder verification method summary web page 3204 is then provided, as shown in FIG. 32. This page provides a summary of the features selected by the user.

FIG. 33 is a view of a web page for the CVM Method 2 3304. This page provides the users with options of designating if the CVM is for domestic, international, or both, and for providing Amount X and Amount Y, and for providing application currency code. The page also provides fields for selecting the Cardholder Verification Method to use, when to use this verification method, and the action to take if this cardholder verification method is not successful.

Cardholder Verification Risk Management Decisions

FIG. 34 is a view of a terminal risk management web page 3404. This page allows a user to select decline transaction offline, send online, or decline if online is unavailable for various decisions. Examples of some of these decisions are: If cardholder verification is not successful, what action should be take? If one of the card holder methods in the card's CVM list is not recognized by the terminal, what action should be taken? If an offline PIN is required and the PIN pad is not working or not present, what action should be taken? If an offline PIN is required and the PIN pad is present but the cardholder's PIN is not entered, what action should be taken? If the Offline PIN try limit is exceeded, what action should be taken? A series of Yes and No questions may also be provided. Examples of some of these questions are: If the offline PIN try limit is exceeded on the current transaction and the transaction is declined offline, should an advice be created? If the offline PIN is exceeded on the current transaction, should the application be blocked? If the offline PIN try limit is exceeded on the previous transaction, should the transaction be declined offline?

Offline Dynamic Data Authentication

The system provides two methods of offline data authentication, which are static and dynamic. In static authentication, a terminal reads static data from the card and runs the data through an algorithm to check to see if the data matches a signature on the card using RSA technology. This authentication is to detect whether data such as the expiration date of the card has been changed. Dynamic authentication provides static authentication, and in addition generates a dynamic signature for each transaction. For dynamic authentication, a private key may be stored on a card. A public key that matches the private key is placed in a certificate, which is read by a terminal. The terminal uses the public key to encrypt data, which is sent to the card. The card is able to validate the encrypted data using the private key.

FIG. 35 is a view of an offline dynamic data authentication web page 3504. The page allows the user to determine if additional terminal-based data elements should be used during the dynamic data authentication process. The EMV specifications require that at minimum, a randomly generated unpredictable number be used, but the user may specify additional data elements.

Offline Data Authentication Risk Management Decisions

FIG. 36 is a view of a web page for Offline Data Authentication Risk Management Decisions 3604. This page provides options for the user to set either decline offline, send online, or decline if online is unavailable for various static or dynamic offline data authentication risk management results that may be encountered by the terminal during transaction processing.

Card Authentication Options

FIG. 37 is a view of a web page for card authentication options 3704. This card authentication process is an online process. This page allows the user to select the appropriate cryptogram version number for the application cryptogram that may be sent online for validation by the issuer. This page provides a detailed description of each version. In this example, the DES encryption process is used. The card contains the DES secret key, which is only known to the issuer. In this process, the card creates a cryptogram using the secret key and data from the card and terminal. The cryptogram is sent to the issuer. Since the issuer holds a master of the secret key, the issuer is able to validate the cryptogram.

Issuer Authentication Options

FIG. 38 is a view of a web page for issuer authentication options 3804. This page allows the user to indicate whether issuer authentication should be performed as an optional feature or should be mandatory. It also provides the user with additional actions to be performed in the event of a failure of issuer authentication. In issuer authentication, the card validates that the information came from the right issuer. In this example a DES key is used.

Issuer Script Risk Management Decisions

FIG. 39 is a view of a web page for issuer script risk management decisions 3904. This page allows the user to indicate whether the next transaction should be sent online following the application's failure to process an issuer script. Issuer script is used by an issuer to update a smart card. When a card is issued to a new cardholder, an issuer may place more stringent controls in the smart card. As the relationship with the cardholder develops and the issuer begins to trust the cardholder more, the issuer may send script through issuer script processing to the smart card that makes the controls more lenient. The issuer script processing may be accomplished when the cardholder places a card in a terminal. This process may be invisible to the cardholder by performing the issuer script processing during a purchase transaction. This web page allows the issuer to decide what action to take if a issuer script process fails.

Visa Low-Value Payment (VLP) Feature

Figure 43:
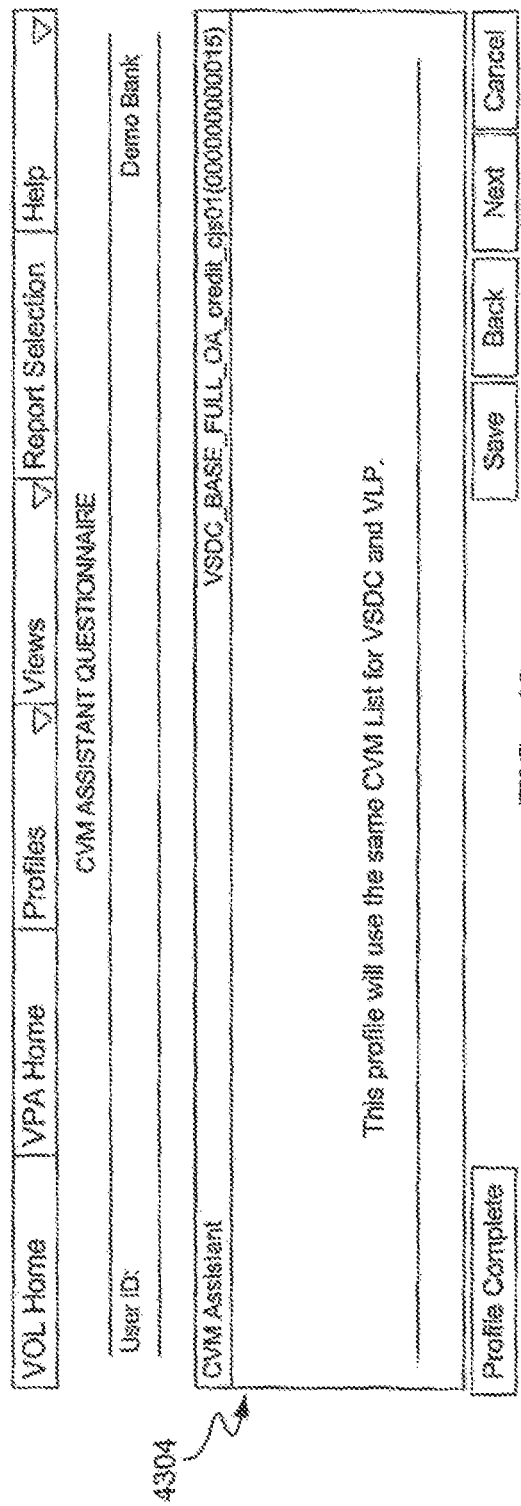
FIG. 43 is a view of a fourth web page for low-value payment.

FIG. 40 is a view of a first web page for a low-value payment (VLP) feature 4004. The low-value payment feature is an optional feature that provides quick offline transaction processing for small-ticket purchases in single-currency markets. This page allows the user to select or change features associated with the low-value payment option. FIG. 41 is a view of a second web page for the low-value payment feature 4104. This page allows the user to indicate whether low-value payment should support the same cardholder verification methods used for the debit credit card or use separate ones. FIG. 42 is a view of a third web page for low-value payment 4204. If the user has indicated "no" to having the same cardholder verification methods used for both debit credit and low-value payment, this page will appear allowing the selection of a cardholder verification method. FIG. 43 is a view of a fourth web page for low-value payment 4304. If the user chooses to use the same cardholder verification methods for credit debit and low-value payment, this page will appear to verify the selection. Although this is designated the fourth web page, it does not designate an order of appearance, since either the third or fourth web page appears, but usually not both during this process. FIG. 44 is a view of a fifth web page for low-value payment 4404. This page allows the user to select the appropriate authorization code, low-value payment funds limit, and to indicate whether or not a low-value single transaction limit should apply.

Data Schema

Figure 49:
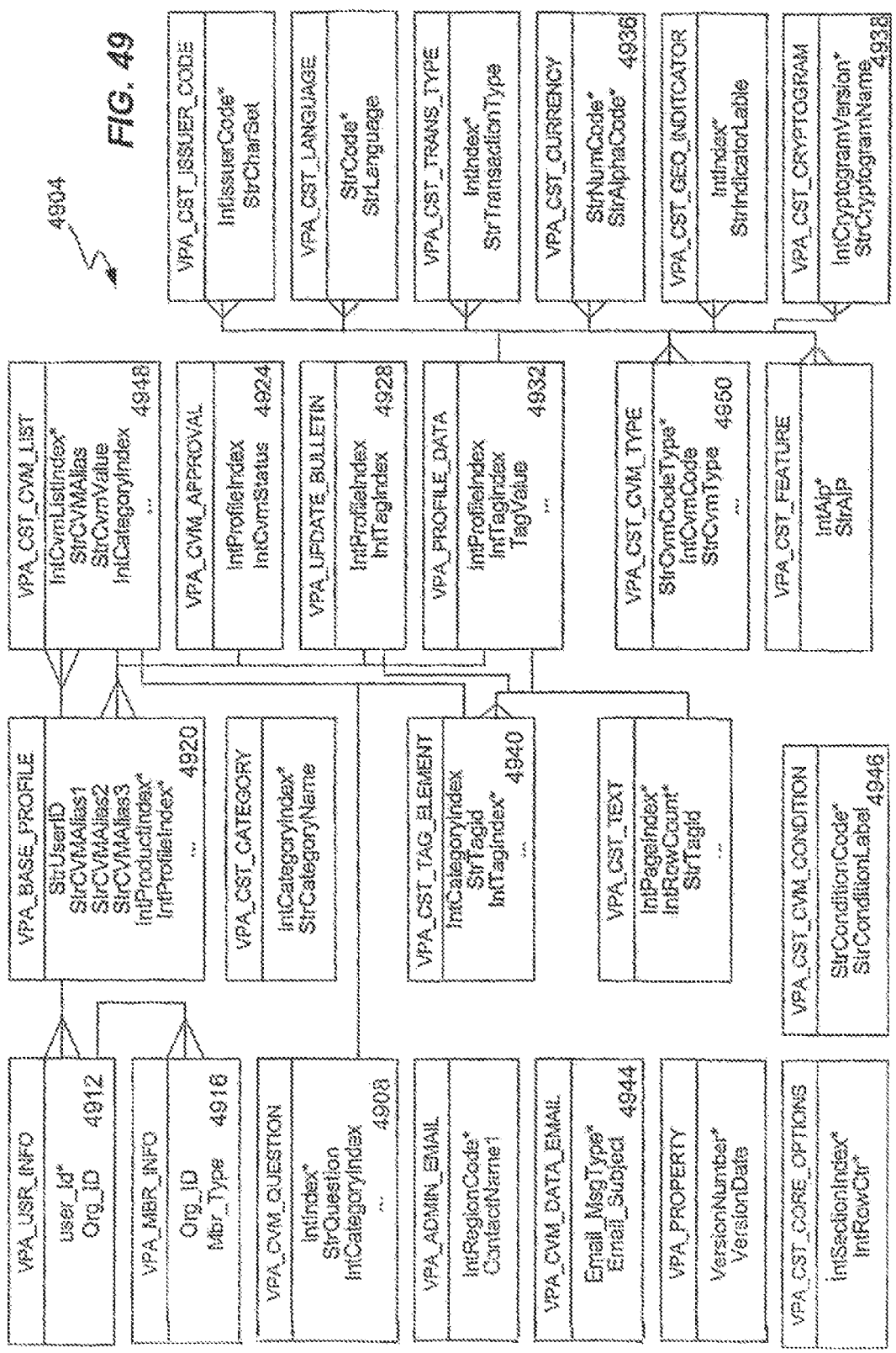
FIG. 49 is an example of a data schema that may be used in an embodiment of the invention.

FIG. 49 is an example of a data schema 4904 that may be used in an embodiment of the invention. The core function of the data schema is to create, store, and maintain universal, regional, country, and member profiles that contain mandatory, default, recommended, and selected settings. Some of the tables in the data schema are used to store profile specific data, while other tables are used as cross-references for setting appropriate value for the profile (lookup tables) or to support some administrative function (e.g. for providing e-mail notification). Generally, the User Information Table 4912, the Member Information Table 4916, the Base Profile Table 4920, the CVM Approval Table 4924, the Update Bulletin Table 4928, and the Profile Data Table 4932 are updated when a profile is added or modified. The remaining tables are normally not updated when a profile is added or modified.

An example of the lookup table is made up of the CVM tables, such as the VPA_CVM_QUESTION table 4908, the VPA_CVM_DATA_EMAIL table 4944, the VPA_CST_CVM_CONDITION table 4946, the VPA_CST_CVM_LIST table 4948, the VPA_CVM_APPROVAL table 4924, and the VPA_CST_CVM_TYPE table 4950. For example, for the Method 1 of CVM, the CVM Assistant Questionnaire Method 1 3104 of FIG. 31 is provided with seven "yes" and "no" questions. In this example, there are a set number (for example 64) different possible combinations of CVM (Card Verification Method) related answers to CVM Method 1 related questions in the questionnaire 3104. A user selects the answers to the questions in the questionnaire 3104 and submits the answers. The combination of answers is compared to the combination of answers of various entries in the lookup table. When a matching combination of answers entry is found in the lookup table, an associated output is provided for the matching entry. FIG. 32 provides a summary of the customer CVM list based on the found associated output.

From a maintenance perspective, the questions in the CVM Method 1 questionnaire 3104 and the associated output in the lookup table may be easily changed without programmers, since the information is in a data table, instead of being part of the program logic. This allows easy rephrasing of questions in the questionnaire by changing data in the VPA_CVM_QUESTION table 4908.

The VPA_CST_CURRENCY table 4936 is a table of all currency supported by the personalization assistant. For the web page for offline limits and thresholds 2504, a pull down menu 2508 is provided to allow the selection of a secondary currency. The entries for the pull down menu may be generated from the VPA_CST-CURRENCY table 4936. The VPA_CST_CRYPTOGRAM table 4938 provides a list of various cryptogram version numbers available for the application cryptogram. The data in the VPA_CST_CRYPTOGRAM table 4938 may be used to generate the pull down menu for the cryptogram version number 3708 in FIG. 37. The use of these types of tables such as the VPA_CST_CRYPTOGRAM table 4938 is that a new cryptogram version may be added and supported merely by adding the new version to the VPA_CST_CRYPTOGRAM table 4938. The program logic then lists all entries in the table at the appropriate places in the web pages. Similarly, new currency may be added or currency may be deleted by adding or deleting the currency entry in the VPA_CST-CURRENCY table 4936. This allows the program logic to display new currency in the appropriate web pages without reprogramming computer logic.

VPA_CST_TAG_ELEMENT table 4940 is a table of tag elements. This table lists descriptions for all tags and may reserve places for future tags. This table also defines tag values and lengths for the different choices. Adding new functionality to a tag may be achieved by changing definitions and tag values in the VPA_CST_TAG_ELEMENT table 4940.

Personalization Assistant Output Options

The output file is a direct translation from the profile. For many of the questions that are answered above, the answer to the question causes a tag value stored in the profile to be set. Programming logic uses the selected answer to set the tag value in the profile. In this example, a tag length and value (TLV) method are used. In this example, once a profile is completed the profile contains about 40 tags.

On completion of the profile creation process, the user will be taken to an output options page 4504, as shown in FIG. 45. On this page, the user may chose from a number of options for creating reports and output files. The choices for reports and output files include a business report, a technical report, a data preparation output file, and a stand-in options report. The contents of all the reports and output files are based on responses made by the user to all of the business questions. The user may view, print, or save any of these reports. They may also be forwarded to a third-party data preparation service bureau or to a regional office for review.

FIG. 46 is a view of a business report 4604, which may be viewed as a web page. The business report provides a high level summary of various business decisions and settings and also notes any best practices violations. Users of this report may include product managers and portfolio managers.

FIG. 47 is a view of a technical report 4704, which may be viewed as a web page. This report provides a summary a various business decisions and settings supported by technical details such as tag, category, length, and values. This report highlights any best practices violations. Users of this report may include member technical staff or regional support representatives.

FIG. 48 is a view of a stand-in options report 4804. This report shows a summary of the stand-in options related to the personalization features. This report will assist the issuer in determining the appropriate stand-in options settings for the account. Users of this report may include regional support representatives in order to determine the appropriate stand-in parameters that should apply to this account.

The option for generating the data preparation output file (personalization data file) will only be displayed if the selected profile is in "active" state. The data preparation output file contains the member profile details that are incorporated into the data preparation process of personalization. The same file may be used on the personalization validation tool 344 to establish an issuer profile for personalization validation. In this embodiment both a comma separated values (CSV) format and an extensible markup language (XML) format are supported.

The comma separated values (CSV) format offers a way to collect data from any table so that it can be conveyed as input to another table-oriented application. It presents the required values in the table as a series of ASCII text lines. Each column value in the table is separated from the next column's value by a comma. Each row starts a new line. Appendix A is a sample CSV data preparation output file. "T=" is used to designate a tag number. "C=" is used to designate a tag name category. "L=" is used to designate a tag length. "V=" is used to designate tag value.

The Extensible Markup Language (XML) format allows the exchange of data between incompatible systems. By converting data to the XML format, there is a significant reduction in the complexity of transferring this data, which makes it possible for this data to be read by many different types of applications and systems. Appendix B is a sample XML data preparation output file. The tag number, tag name category, tag length, and tag value are more easily labeled as shown in the example.

In the XML file in appendix B, line 20, defines a tag number. Line 21 defines a tag length. Line 22 defines a tag value. Other tags, tag lengths, and tag values are defined in other parts of the XML file.

Other embodiments of the invention may use other configurations, such as it may be possible to connect the local systems to the web host through a network that is not the Internet. The requirement that the personalization assistant generates the data preparation table of values and the storage of the data preparation table of values 138 on the web host, helps to assure that all data preparation table of values 138 submitted to the preparation processing device meet certain mandates to ensure compatibility. It is also possible to store the data preparation table of values on the local system and still provide ensure compatibility.

The invention provides a user friendly tool that is able to take business related answers to generate technical settings expressed in a data preparation table of values, without requiring the understanding of the technical settings. The invention also provides a data preparation table of values that embodies the best practice of rules and that does not contain any prohibited combination of data elements.

Some of these features may have mandates or recommendations that are set at a national, regional, or global level. For example, a global recommendation of a pin length may be for at least five characters. A region, such as Europe, may have a mandate that the pin length be at least six characters. A country within the region may require that pin length be at least seven characters. An issuer within country may be able to require that pin length be at least eight characters. Since there are several different possible approval levels, recommendations and mandates at the different approval levels may quickly change. As a result, it is desirable to have a personalization assistant to assist users in applying any changes. The templates in the prior art would be too complex to allow changes to be applied quickly and effectively. In addition, it would be difficult to continuously update templates that are used on stand alone system. The look up table allows the recommendations and mandates to be more quickly changed than if the recommendations and mandates were placed in program logic. In addition, since the personalization assistant 320 is located at a centralized web host, it is much easier to provided updates globally, than trying to update templates on many stand alone systems.

A central system also allows e-mail communication with an issuer or the central system to obtain approvals at various stages. If used in a stand alone system, e-mail may also be used to obtain certain approval.

While this invention has been described in terms of several preferred embodiments, there are alterations, permutations, modifications and various substitute equivalents, which fall within the scope of this invention. It should also be noted that there are many alternative ways of implementing the methods and apparatuses of the present invention. It is therefore intended that the following appended claims be interpreted as including all such alterations, permutations, modifications, and various substitute equivalents as fall within the true spirit and scope of the present invention.

APPENDIX A

Sample CSV File:

```
Organization: Demo Bank
PAN: 1111222233334444-1111222233334444
Profile: FullVSDC-Issuer-CreditProfile01
ProfileId: 000000000017
Application Default Action: T=9F52, C=VSDC, L=02, V=(0000)
Application Expiration Date: T=5F24, C=VSDC, L=03, V=(101011)
Application Identifier (AID): T=4F, C=VSDC, L=07, V=
(A0000000031010)
Application Interchange Profile (VSDC): T=82, C=VSDC, L=02, V=
(7C00)
```

APPENDIX B

Sample XML File:

```
<?xml version="1.0" encoding="ISO-8859-1" ?>
  <!DOCTYPE config [
    <!ELEMENT config        (tagelement+)>
    <!ELEMENT tagelement    (tagname, tag, taglength, tagvalue)>
    <!ELEMENT tagname       (#PCDATA)>
    <!ELEMENT tag           (#PCDATA)>
    <!ELEMENT taglength     (#PCDATA)>
    <!ELEMENT tagvalue      (#PCDATA)>
    <!ATTLIST config pan CDATA #IMPLIED>
    <!ATTLIST config profile CDATA #REQUIRED>
    <!ATTLIST config profileid CDATA #REQUIRED>
    <!ATTLIST tagname category (VSDC|VLP|Domestic|International)
        "VSDC">
  ]>
  <config pan="1111222233334444-1111222233334444" org="Demo
      Bank" profile="FullVSDC-Issuer-CreditProfile01"
      profileid="000000000017">
```

APPENDIX B-continued

Sample XML File:

```
  <tagelement>
      <tagname category="VSDC">Application Default
          Action</tagname>
      <tag>9F52</tag>
      <taglength>02</taglength>
      <tagvalue>0000</tagvalue>
  </tagelement>
  <tagelement>
      <tagname category="VSDC">Application Expiration
          Date</tagname>
      <tag>5F24</tag>
      <taglength>03</taglength>
      <tagvalue>101011</tagvalue>
  </tagelement>
      <tagname category="VSDC">Application Identifier
          (AID)</tagname>
      <tag>4F</tag>
      <taglength>07</taglength>
      <tagvalue>A0000000031010</tagvalue>
  </tagelement>
  <tagelement>
      <tagname category="VSDC">Application Interchange
          Profile (VSDC)</tagname>
      <tag>82</tag>
      <taglength>02</taglength>
      <tagvalue>7C00</tagvalue>
  </tagelement>
</config>
```

What is claimed is:

1. A method for automating the personalization of a batch of smart cards that originates with a smart card issuer, said method comprising:

executing a personalization assistant software tool, said software tool including a default member profile having default values for smart card features, a smart card feature being a parameter representing a business requirement of said smart card issuer dictating smart card usage;

providing a user with a plurality of queries regarding said smart card features, said queries originating from said software tool;

receiving from the user, responses to the plurality of queries, said responses being received by said software tool and reflecting smart card features desired by said smart card issuer;

matching each of said responses with an output data value, said matching being performed by said software tool, each of said output data values representing one of said smart card features and being suitable for personalizing a smart card;

modifying said default member profile to include said matched output data values, said output data values replacing corresponding said default values for smart card features; and generating a personalization data file from said modified default member profile, wherein said personalization data file is suitable for personalizing said batch of smart cards and provides said smart card features on each smart card in said batch of smart cards by way of said output data values.

2. The method, as recited in claim 1, further comprising:

using individual cardholder input files and the personalization data file to personalize said batch of smart cards to yield a plurality of personalized smart cards.

3. The method, as recited in claim 1, wherein said matching includes:
provic a look up table with entries for various combinations of responses to the plurality of queries;
finding a matching entry in the look up table that matches the responses to the plurality of queries;
locating one of said output data values associated with the matching entry; and
outputting the one of said output data values associated with the matching entry.

4. The method, as recited in claim 1, wherein the plurality of queries, comprise:
at least one query regarding smart card account usage control;
at least one query regarding smart card account risk management; and
at least one query regarding offline limits and thresholds.

5. The method, as recited in claim 4, wherein responses to the plurality of queries are used to provide best practices recommendations.

6. The method, as recited in claim 1, further comprising:
providing regional profiles and subregional profiles, wherein a subregion is within a region, wherein the regional and subregional profiles have mandatory and recommended settings, wherein some of the subregional profiles are more stringent than regional profiles in which the subregions belong.

7. A computer implemented method for automating the personalization of a batch of smart cards that originates with a smart card issuer, comprising:
running on a host computer a personalization assistant software application, said software application including a default member profile having default values for smart card features, a smart card feature being a parameter representing an issuer business requirement dictating smart card usage;
providing to at least one user over a network a plurality of queries regarding said smart card features, said queries originating from said software application;
receiving from the at least one user over the network responses to the plurality of queries, said responses being received by said software application and reflecting smart card features desired by said smart card issuer;
matching each of a plurality of combinations of said responses with an output data value, said matching being performed by said software application;
modifying said default member profile to include said matched output data values, said output data values replacing corresponding said default values for smart card features;
generating a personalization data file from said modified default member profile, wherein said personalization data file is suitable for personalizing said batch of smart cards and provides said smart card features on each smart card in said batch of smart cards by way of said output data values; and
personalizing said batch of smart cards utilizing said personalization data file, said personalization data file providing said smart card features on each smart card in said batch of smart cards by way of said output data values.

8. The computer implemented method, as recited in claim 7, further comprising:
sending the personalization data file to a preparation processing device; and
using the personalization data file and cardholder input files to personalize smart cards.

9. The computer implemented method, as recited in claim 7, wherein said matching includes:
providing a look up table with entries for various combinations of responses to the plurality of queries;
finding a matching entry in the look up table that matches the responses to the plurality of queries;
locating one of said output data values associated with the matching entry; and
outputting the one of said output data values associated with the matching entry.

10. The computer implemented method, as recited in claim 7, wherein the plurality of queries, comprise:
at least one query regarding smart card account usage control;
at least one query regarding smart card account risk management; and
at least one query regarding offline limits and thresholds.

11. The computer implemented method, as recited in claim 10, wherein responses to the plurality of queries are used to provide best practices recommendations.

12. The computer implemented method, as recited in claim 7, further comprising providing regional profiles and subregional profiles, wherein a subregion is within a region, wherein the regional and subregional profiles have mandatory and recommended settings, wherein some of the subregional profiles are more stringent than regional profiles in which the subregions belong.

* * * * *